Dec. 29, 1942.  J. P. DURNING  2,306,381
FEED FOR CIGAR BUNCH MACHINES
Filed March 1, 1938  9 Sheets-Sheet 1

INVENTOR
JAMES P. DURNING
BY George Hastings
ATTORNEY

Dec. 29, 1942. J. P. DURNING 2,306,381
FEED FOR CIGAR BUNCH MACHINES
Filed March 1, 1938 9 Sheets-Sheet 2

INVENTOR
JAMES P. DURNING
BY George S. Hastings
ATTORNEY

INVENTOR
JAMES P. DURNING
BY George L. Hastings
ATTORNEY

Dec. 29, 1942.　　　J. P. DURNING　　　2,306,381
FEED FOR CIGAR BUNCH MACHINES
Filed March 1, 1938　　　9 Sheets-Sheet 4
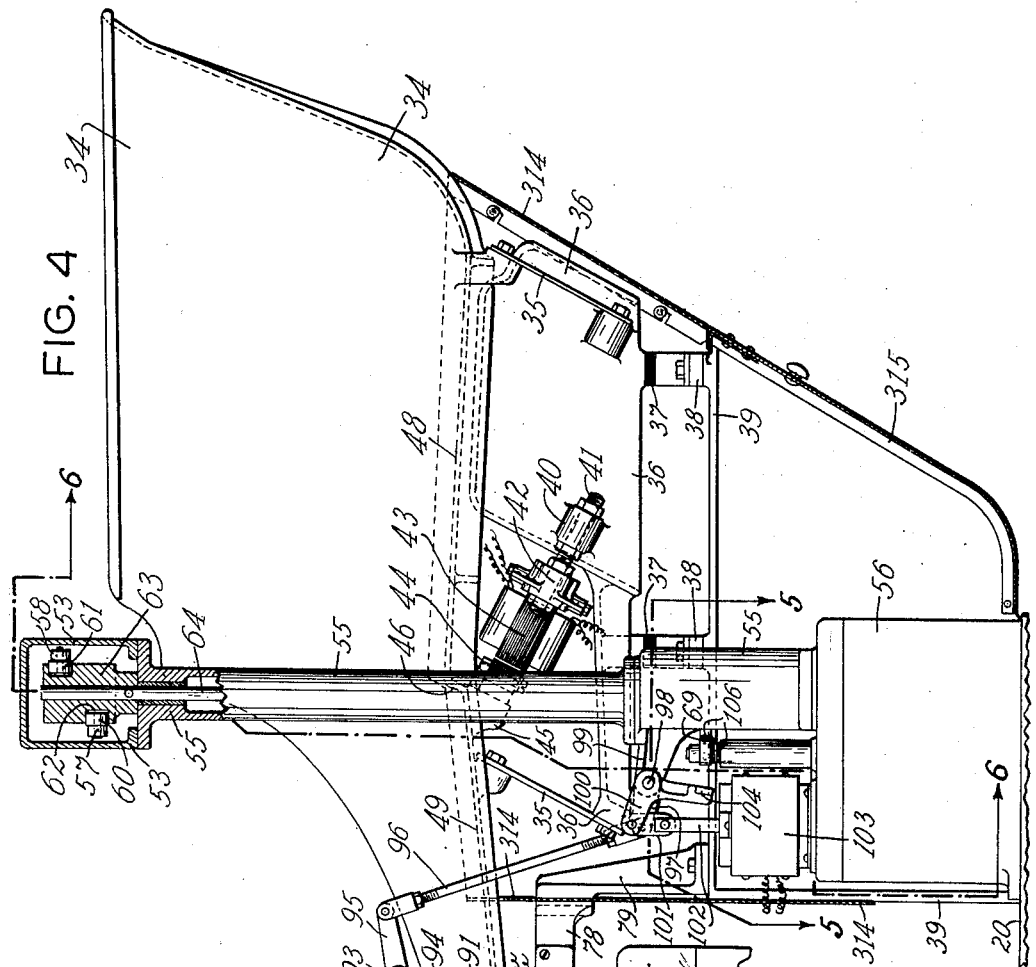
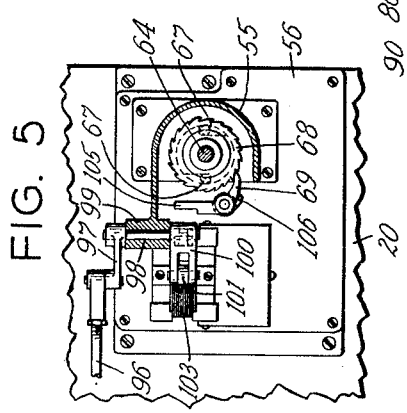
INVENTOR
JAMES P. DURNING
BY George Harding
ATTORNEY

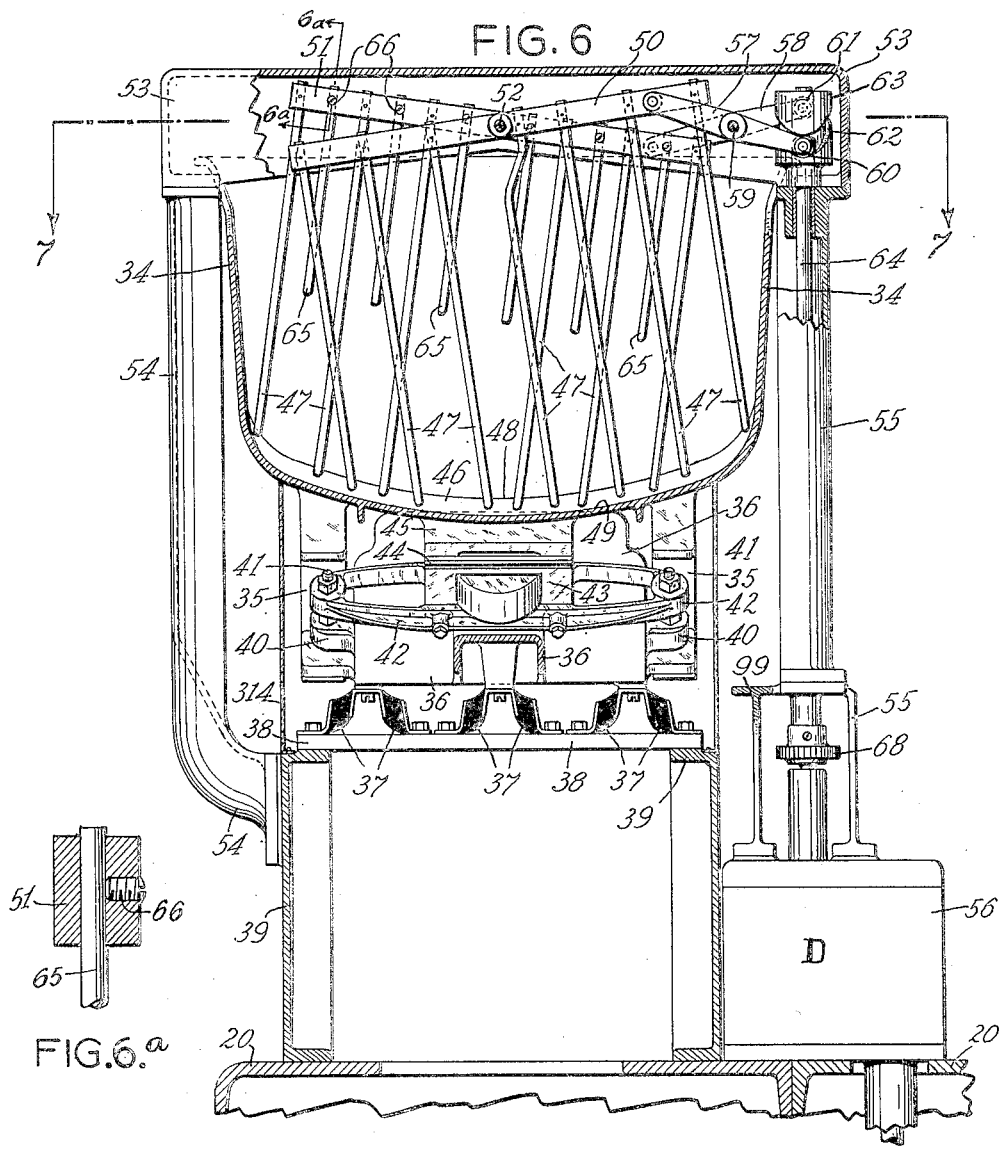
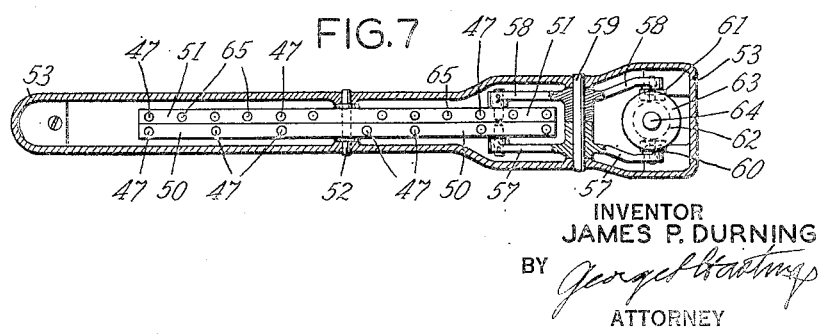

Dec. 29, 1942.    J. P. DURNING    2,306,381
FEED FOR CIGAR BUNCH MACHINES
Filed March 1, 1938    9 Sheets-Sheet 6

INVENTOR
JAMES P. DURNING
BY
ATTORNEY

Dec. 29, 1942.  J. P. DURNING  2,306,381
FEED FOR CIGAR BUNCH MACHINES
Filed March 1, 1938  9 Sheets—Sheet 7
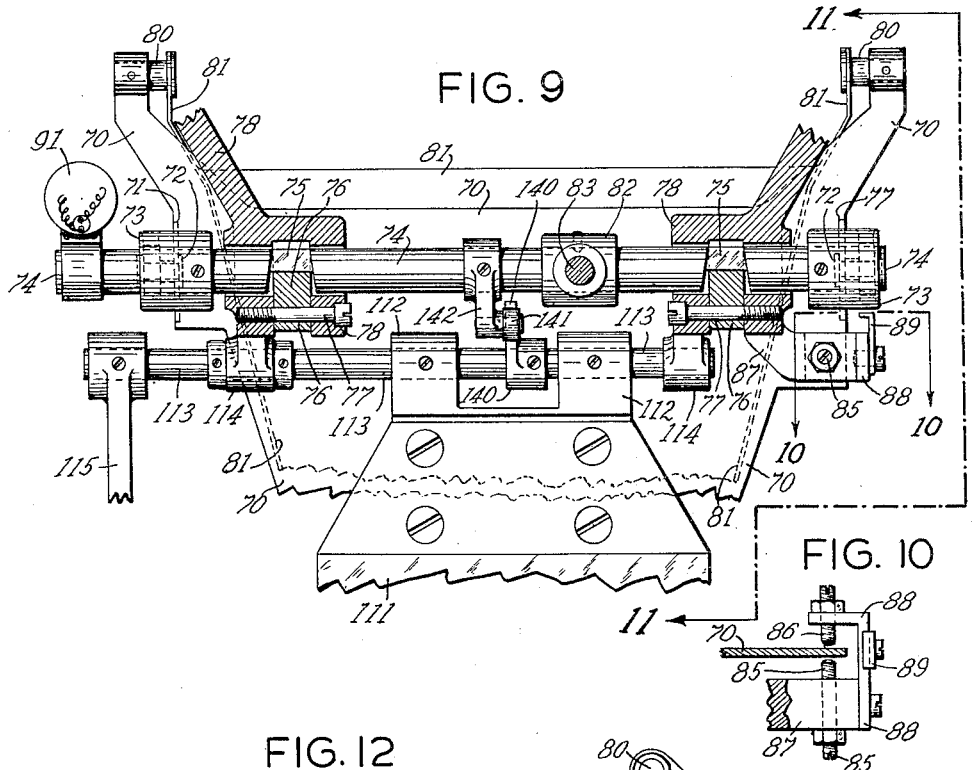
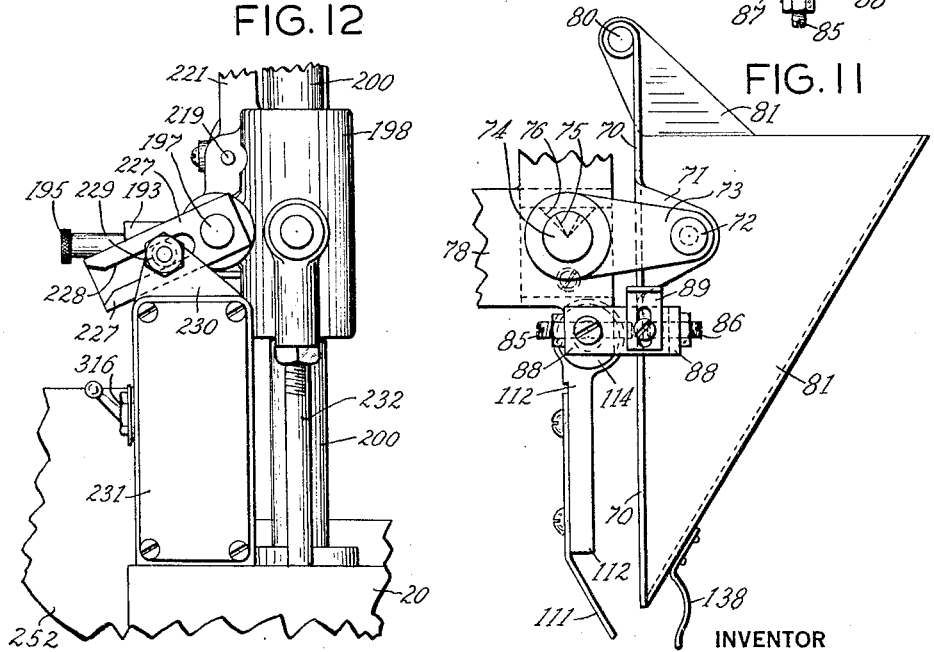
INVENTOR
JAMES P. DURNING
BY George S. Hastings
ATTORNEY Dec. 29, 1942.          J. P. DURNING                2,306,381
                FEED FOR CIGAR BUNCH MACHINES
              Filed March 1, 1938         9 Sheets-Sheet 8

INVENTOR
JAMES P. DURNING
BY *George S. Hostings*
ATTORNEY

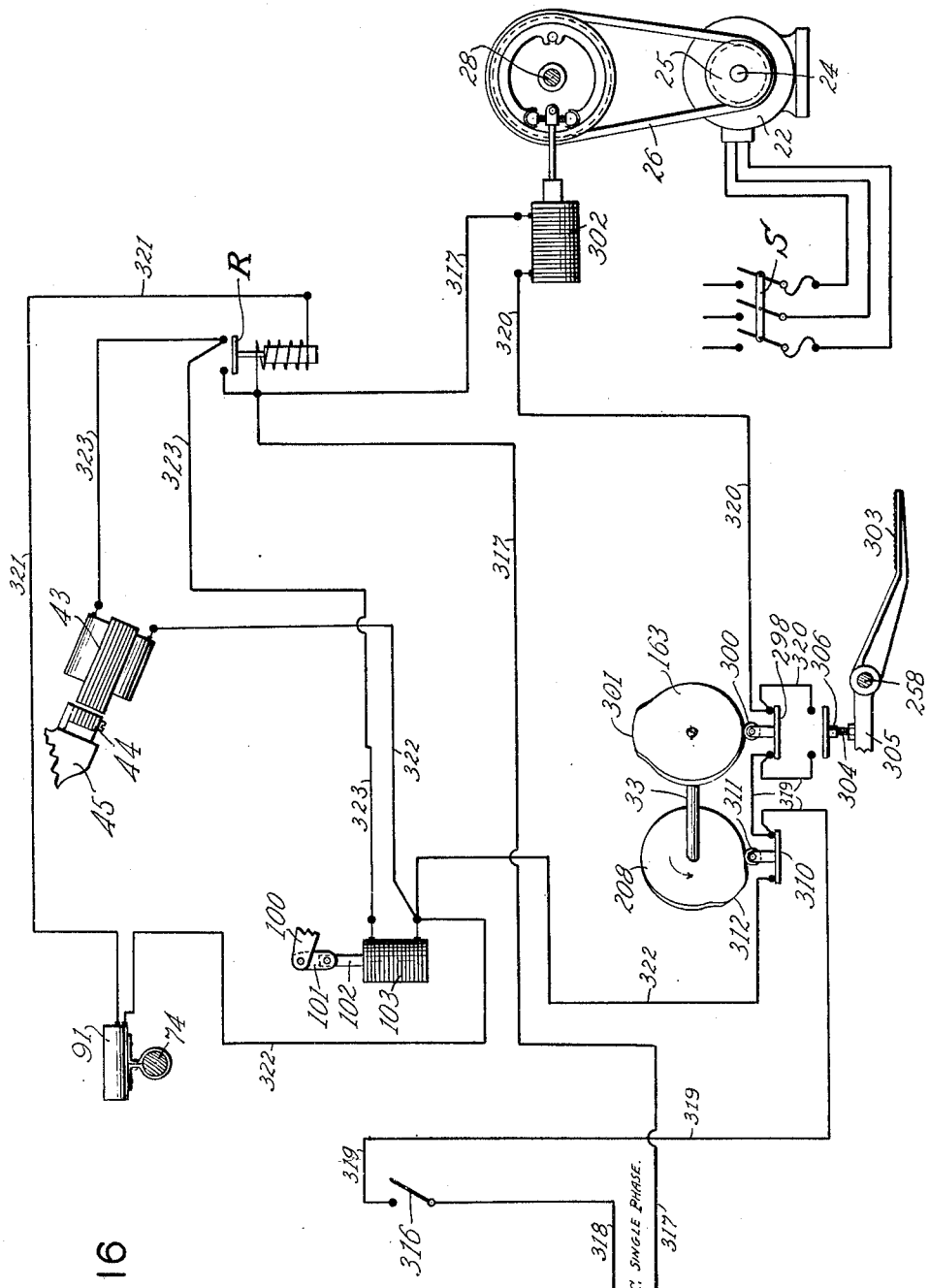

Patented Dec. 29, 1942

2,306,381

UNITED STATES PATENT OFFICE 2,306,381

FEED FOR CIGAR BUNCH MACHINES

James P. Durning, St. Albans, N. Y., assignor to International Cigar Machinery Company, a corporation of New Jersey Application March 1, 1938, Serial No. 193,244

56 Claims. (Cl. 131—22)

This invention relates to tobacco feeding mechanism for short filler or soft work cigar machines, and has for its main object the provision of means for feeding this kind of tobacco in such a manner that substantially all the pieces fed will lie in a longitudinal or axial direction of the bunches formed. It is of great importance that short filler tobacco be fed as uniformly as possible, that is, that the smaller pieces and larger pieces be fed together and that one size be not separated from the other as the tobacco is being advanced to a charge forming mechanism. Accordingly, in the present invention, a feed has been developed in which tobacco is fed with great uniformity to a measuring device wherein the tobacco pieces are subsequently formed into bunch charges.

The invention consists in an open hopper having a bottom portion, tobacco confining walls, a discharge end, and a transverse dividing step which in effect divides the hopper into two separate sections: a tobacco confining section and a discharge portion over which tobacco fed from the confining section is advanced to a weighing device.

It is a further object of the invention, therefore, to provide a novel tobacco feeding hopper and to furnish means for feeding tobacco therefrom, such for instance as vibratory mechanism which vibrates the hopper in order to advance tobacco from the hopper to bunch forming instrumentalities.

It is a further object of the invention to provide mechanism for confining tobacco in the storage section of the hopper and to cause this mechanism to control the advance of tobacco from the confining over the discharge section of the hopper.

This mechanism also consists of a plurality of sets of rakes arranged for relative movement directly in front of the step portion of the hopper and with their ends either below or in the plane of the hopper bottom above the step so that tobacco confined in the hopper can not move forward from its confinement therein beneath the fingers and can, therefore, only be fed when there is a relative motion imparted to the rakes.

In order to properly maintain the face of the tobacco in the confining section there is provided a set of auxiliary fingers which may be raised or lowered to assist in the confining of tobacco in the hopper and also to prevent an excessive feed of tobacco therefrom.

The invention also consists in the provision of intermittently operated tobacco feed control rakes and means for adjusting the speed of the rake movement while at the same time the stroke of the rakes remains constant.

It is a further object of the invention to provide means for vibrating the hopper and controlling the rake movement in order that a thin stream of tobacco may be fed from the hopper to a charge weighing device. This results in the formation of more perfect bunches due to the fact that substantially all the pieces of tobacco discharged from the stream into the weighing device will tend to lie parallel one to the other during the feeding and subsequent operations.

It is a further object of the invention to provide improved tobacco weighing mechanism wherein the scale pan may be set to take a fixed charge and be of such a shape that tobacco particles fed thereto will be self-aligned.

It is also an object of the invention to provide a tobacco charge weighing mechanism which has associated therewith means for controlling the vibration of the tobacco hopper and also the movement of the control rakes.

The invention also consists in the provision of means for eliminating the waste of tobacco by preventing the feed of additional tobacco to the scale pan so long as the gate of the tobacco charge receiving mechanism remains open.

The invention also consists of the provision of a distributing plate associated with the tobacco weighing scale pan, which plate performs the functions of distributing charges and maintaining in alignment tobacco discharged from the scale pan into the bunch forming mechanism.

It has been found when handling short filler tobacco that it tends to work beneath and above the plunger of the tobacco compression chamber and severely interfere with the most efficient operation of the machine. It is a further object, therefore, of the invention to provide means forming a part of the compression chamber which allows the plunger to be substantially self-cleaning so that at the end of each rearwardly reciprocating stroke any tobacco tending to cling to any part of the plunger will be removed therefrom, thereby obviating the necessity of stopping the machine to clear this particular part.

A further object of the invention, therefore, is the provision of fingers at the rear of the compression chamber which allows the plunger in said chamber to clear itself of tobacco particles tending to adhere thereto in order to withdraw any waste particles which have been stripped from the plunger. A receptacle may be provided for receiving this waste, and if desired this receptacle may take the form of a pneumatic conduit, which when provided with a conveying fluid draws off any waste particles present.

A further object of the invention is to provide automatic means for stopping the feed of tobacco from the hopper in the event that the gate of the compression chamber is open. This improvement consists of a cam which engages a member that forces the scale pan down and thereby opens an electric circuit stopping the feed from the hopper.

The invention further consists in the provision of means for detecting the presence of a sufficient quantity of tobacco in the compression chamber, and if the quantity is above a set amount preventing the feed of additional tobacco thereto. Whenever an insufficient quantity of tobacco is present in the compression chamber, automatic operating detecting mechanism is set into operation, reacts to the lack of the proper quantity and causes the trap door of the tobacco compression chamber to effect the feed of further tobacco into the charge measuring chamber.

The invention also contemplates the provision of improved cutting mechanism, comprising a knife which can be rapidly removed from the machine for replacement or sharpening, and means so mounting the knife that if an obstruction is present in the tobacco being cut, the knife will yield and thereby avoid destruction to it or its cutting edge.

The invention also consists in the provision of electric control means which brings the machine and its associated elements to a complete stop on each cycle of the machine, and in addition thereto, a manual control device is provided to continue the operation of the machine at the will of the operator regardless of the operation of the automatic control means.

The invention also has an object in the provision of means for creating suction in the suction chamber of the bunch rolling apron mechanism and also in the pneumatic waste removal duct adjacent the rear of the compression chamber together with means for diverting the suction from said chamber to said duct and conversely.

With these and other objects not specifically mentioned in view, the invention consists in certain constructions and combinations which will be hereinafter fully described and then set forth in the claims hereunto appended.

In the accompanying drawings:

Fig. 4 is a side elevation of the vibrating hopper;

Fig. 5 is a sectional plan view of the rake control mechanism, taken on line 5—5 of Fig. 4;

Fig. 6 is a sectional front elevation of the vibrating hopper, taken on line 6—6 of Fig. 4;

Figure 6a is a sectional view taken on line 6a—6a of Figure 6;

Fig. 7 is a sectional plan view of the rake arrangement taken on line 7—7 of Fig. 6;

Fig. 9 is a sectional end elevation of the scale supporting and controlling mechanisms, taken on line 9—9 of Fig. 8;

Fig. 10 is a sectional plan view, taken on line 10—10 of Fig. 9, showing the guide arrangement of the scale plate;

Fig. 11 is a side elevation of the scale, taken on line 11—11 of Fig. 9;

Fig. 12 is a side elevation of the transfer guide and controlling mechanism, taken on line 12—12 of Fig. 2;

Fig. 16 is a wiring diagram showing the electrical connections of the machine.

Figure 1:
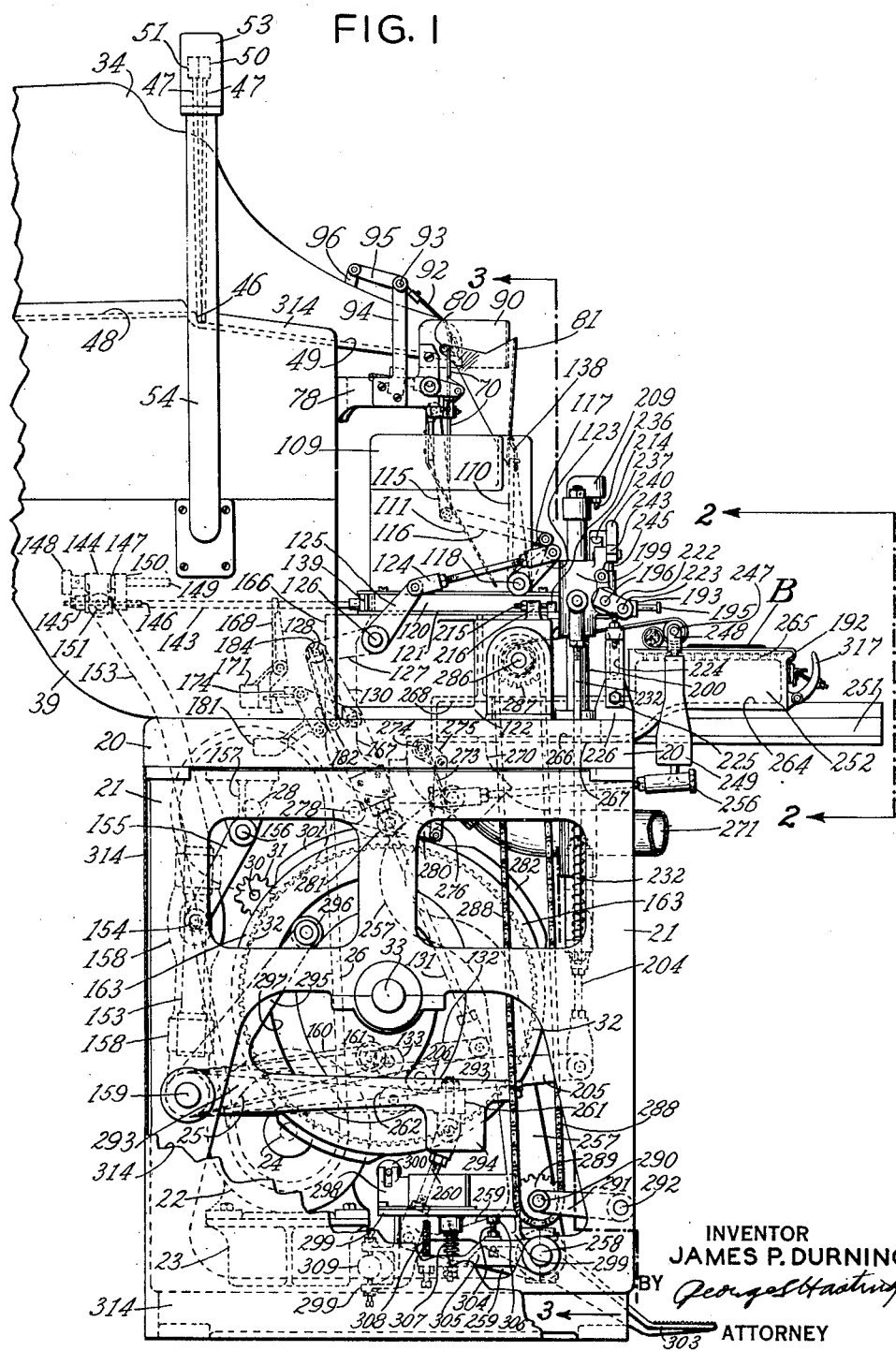
Fig. 1 is a partial side elevation of the machine.

The machine consists of a bed plate 20 suitably mounted upon two supporting frames 21, and is driven by means of a motor 22 (Fig. 3) mounted on a bracket 23 held by one of the frames 21. Motor shaft 24 carries a pulley 25 which, by means of a belt 26 drives a pulley 27 mounted on a shaft 28 driving through a clutch (not shown), a set of conventional reduction gears (not shown), supported in and enclosed by a housing 29 which is mounted on one of the frames 21. A shaft 30 connected to said gear train and projecting from housing 29 carries a gear 31 meshing with gear 32 mounted on the main cam shaft 33 supported by bearings in frames 21.

The short filler tobacco is deposited in a hopper 34 (Figs. 4 and 6) resiliently supported by means of a number of leaf springs 35 fixed to a resiliently mounted vibrator base 36. In the illustrated embodiment base 36 is attached to resilient rubber cushions 37 fastened to a pair of cross-bars 38 mounted on a hopper supporting frame 39 secured to the bed plate 20 of the machine. Vibrator base 36 is equipped with lugs 40 on which, by means of studs 41, is adjustably mounted a magnet supporting bracket 42 holding a magnet 43. An armature 44 is fastened directly to a lug 45 on hopper 34 (Figs. 4 and 6). By increasing or decreasing the gap between the armature 44 and the magnet 43, the amplitude of the vibration can be changed to any desirable degree, thus making it possible to feed from the hopper any type of short filler or scrap tobacco with equally good results.

The bottom portion of the hopper 34 is provided with a transverse step 46 which in effect separates the hopper into two sections, viz., a rear storage chamber 48 or portion in which a mass of tobacco is deposited and confined by a plurality of movable rakes 47, and a feed part 49 provided with a distributing lip L over which a stream of tobacco issuing from the storage portion is fed to the weighing mechanism 81.

In the illustrated embodiment of the invention, two sets of rake bars are provided, and these are arranged in two rows. One set is adapted to be moved relative to the other. The bars or fingers 47 are held at their upper ends in suitable supporting and operating arms 50 and 51. Preferably the length of the rake bars or fingers is such, and they are so located that they move transversely across the hopper directly in front of the step 46 and below the plane of the bottom of the tobacco confining chamber 48, so that they quite effectively act to prevent any tobacco from trickling out or otherwise moving from the confining chamber unless the rake fingers themselves are moved transversely to allow the tobacco to feed from the hopper. In the illustrated embodiment arms 50 and 51 are mounted at their center portion for pivotal movement on a stud 52 which is secured in housing 53 supported by vertical U-shaped brackets 54 and 55. Bracket 54 is fastened to supporting frame 39 while bracket 55 is mounted on a variable speed drive housing 56 secured to bed plate 20. One end of operating arm 50 is pivoted to a lever 57 and one end of arm 51 is pivoted to a lever 58. Both levers 57 and 58 are loosely mounted on a stud 59 supported by housing 53. Lever 57 carries a cam follower 60, while lever 58 carries a cam follower 61. Both cam followers 60 and 61 engage in the illustrated fashion (see Fig. 6) with a cam track 62 of a cam 63 mounted on the upper end of a vertical shaft 64 supported by bearings of bracket 55. During operation the two rows of rake bars or fingers 47 are oscillated in opposite directions, thereby scraping the tobacco pieces, which protrude through said rakes, from the feeding face of the tobacco mass in the chamber, thus allowing more tobacco to be fed forward and insuring a better removal of the same from the feeding face. The action of the double row of rakes also prevents the forming or passing of any lumps of scrap tobacco and insures free leaf feed to the charge forming mechanism. The step 46 in the hopper 34 will prevent any tobacco from getting under the ends of the oscillating rake bars 47 thereby achieving the important object of feeding a thin layer of scrap tobacco from the storage chamber 48 of hopper 34 into the feeding trough 49 of the same. Another important feature is that the bottom of hopper 34 is shaped in such a manner and the rakes are so designed that their lower ends retain the same clearance from the bottom of the hopper at all times.

In order to prevent tobacco from spilling through the rakes 47 while loading the storage chamber 48, an auxiliary row of shorter rake bars or fingers 65 is provided. These may be separately mounted, or as shown, may be adjustably fastened to the operating bar 51 (Figs. 6 and 7). These short rakes 65 also control the height of the feeding face of the tobacco mass confined by the rakes. This arrangement substantially insures that tobacco can only pass through the spaces formed by the long rakes 47 while the shorter rakes 65 hold the rest of the mass back. Rakes 65 can be set at any desirable position by means of set screw 66 (Fig. 6). This adjustable control of the feeding face of the tobacco mass is important as it permits the use of any size of short filler tobacco and still retains the important feature of feeding tobacco in a thin layer from the hopper into the scale. During the operation of the machine the bottom portion of the tobacco mass within the storage chamber 48 moves towards the oscillating rakes 47 and 65 while the hopper is being vibrated by magnet 43 and armature 44. As the tobacco mass piles upon the rakes, the "feeding face" can easily be changed by raising or lowering the short rakes 65 in the described manner.

Figure 3:
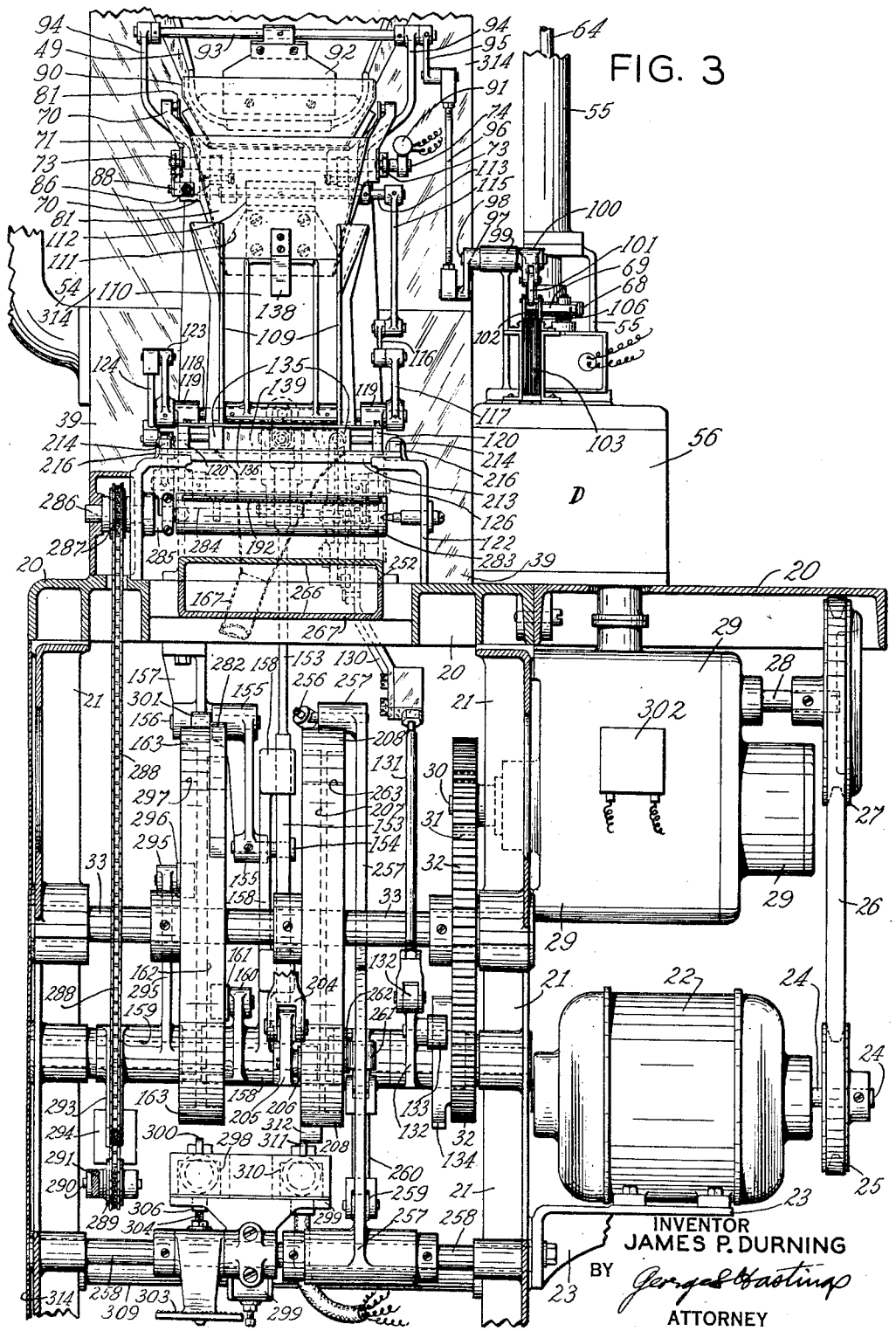
Fig. 3 is a sectional front elevation of the machine taken on line 3—3 of Fig. 1.

The vertical shaft 64, which through cam 63 oscillates rakes 47 and 65, is driven by means of a conventional ball clutch 67 (Fig. 5) by means of a conventional variable speed drive indicated by the legend D secured in housing 56 (Figs. 3, 4 and 6). This variable speed drive in housing 56 is connected by conventional driving means (not shown) with the main gear drive in housing 29 (Fig. 3). Ball clutch 67 is carried by a ratchet 68 which, when engaging with a stationary pivoted pawl 69 causes the disengagement of shaft 64 from the continuously driven variable speed drive in housing 56 and thereby stopping the oscillating motion of rakes 47 and 65 as will be more fully described hereinafter.

Figure 8:
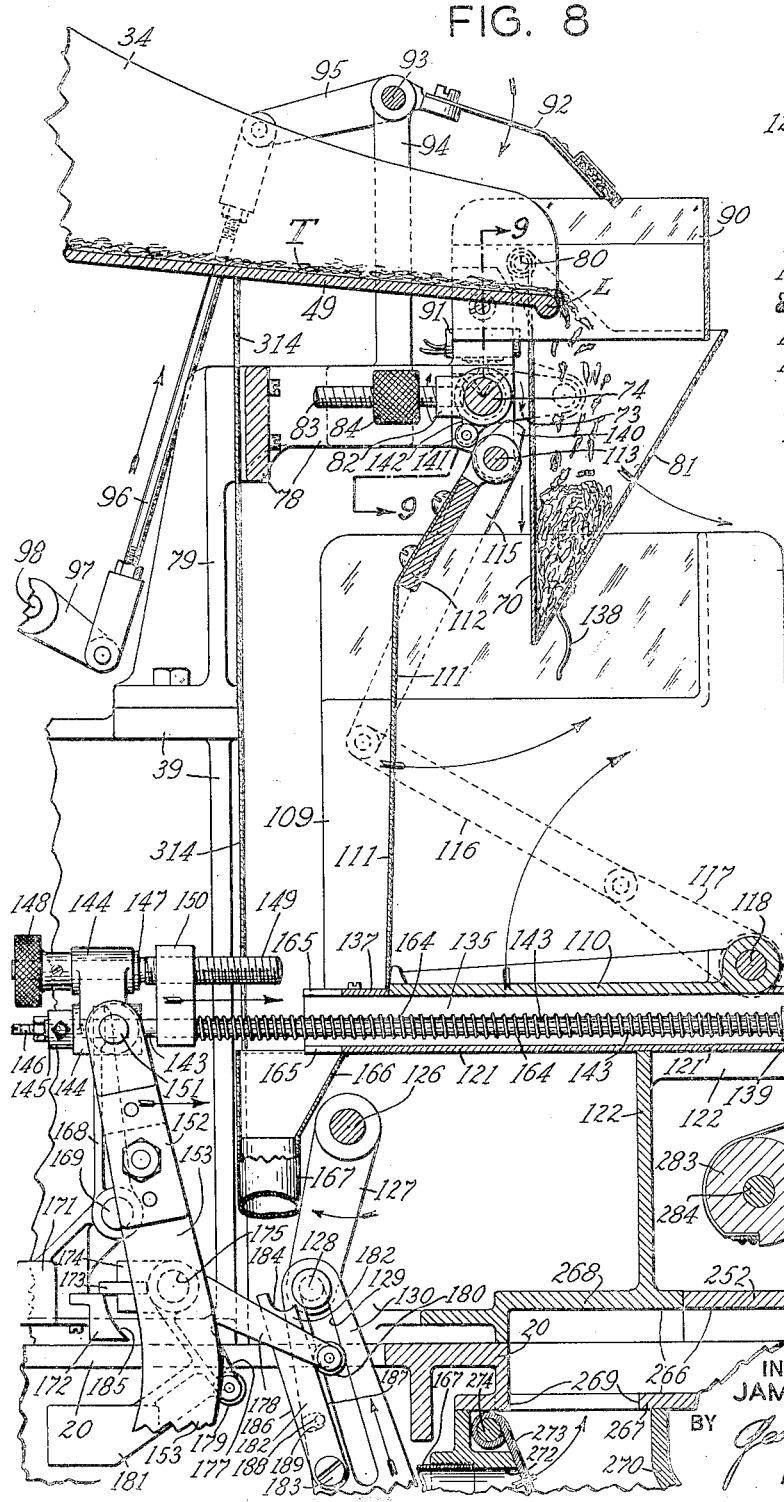
Fig. 8 is a sectional side elevation of the scale, the guide chute, the magazine, the knife and the transfer mechanisms of the machine.

The tobacco is fed from the mass within the storage chamber 48 by means of rakes 47 on to the feeding trough 49 where said tobacco will form a thin layer T (Fig. 8). Due to the vibration imparted to hopper 34 said layer T will move over section 49 towards and discharge into a scale pan of a scale mechanism illustrated in Figs. 8, 9, 10 and 11. The scale pan of this embodiment located below the mouth of feed trough 49, consists of a vertical scale plate 70, each side edge of which is provided with a lug 71, arranged to engage individual pivots 72, which are mounted in scale arms 73, both of which are fixed on a scale shaft 74. The latter is provided with a pair of knife edges 75 resting in knife edge blocks 76 fastened by means of studs 77 to a U-shaped supporting bracket 78 mounted on a bracket 79 attached to the hopper supporting frame 39. The upper portion of scale plate 70 carries a pair of studs 80 pivotally mounting a scale receptacle 81 forming, together with plate 70, the scale pan into which the tobacco T fed from the hopper is delivered. It will be noted that the scale is substantially wedge shaped in cross section. This design is of importance in aligning the pieces of short filler tobacco entering the pan because the pieces, if not already in alignment enter the pan, strike the walls 70 and 81, swing around into alignment and fall to the bottom of the pan. To scale shaft 74 is fastened a lug 82 carrying a threaded stud 83 which supports a movable weight block 84. The latter serves the purpose of balancing the scale pan as well as determining the amount of tobacco necessary to trip the scale pan. In order to prevent scale plate 70 from swinging, except when desired, its movements are controlled by guide screws 85 and 86 (Figs. 9, 10 and 11). Guide screw 85 is held by a lug 87 extending from one end of the U-shaped supporting bracket 78. To lug 87 is attached a bracket 88 which supports the second guide screw 86. Bracket 88 also carries an adjustable stop lug 89 provided for the purpose of arresting the downward movement of corresponding scale arm 73, thereby determining the lowest position of the scale pan and preventing it from dropping too low. The ends of the U-shaped supporting bracket 78 carry a guide shield 90 (Fig. 8) provided to avoid spilling of tobacco during the feeding operation of trough 49.

As the thin layer of tobacco forwarded by the vibrating feed trough is fed into the scale pan just described, the latter trips when the desired amount is deposited therein. As the scale pan trips, a mercury switch 91, connected in an electric circuit and attached to one end of scale shaft 74, is swung through an arc thereby causing the circuit leading to the vibrator magnet 43 to be interrupted, thus causing the vibration of hopper 34 and feeding of tobacco to the scale pan to stop. In order to prevent additional tobacco from discharging from the hopper into the scale pan after the same is tripped, a tobacco flow control plate 92 swings downward and closes the mouth of feed trough 49 as soon as the vibration of hopper 34 is stopped. This plate 92 in the embodiment shown is electrically operated, and its action is governed through a circuit also controlled by mercury switch 91. Control plate 92 is attached to a shaft 93 supported by a pair of bearing brackets 94 mounted on the U-shaped supporting bracket 78. On shaft 93 is mounted a lever 95 which, through a rod 96, is connected to a lever 97 secured to a shaft 98 supported by a bearing lug 99, Figures 4 and 5, of bracket 55. To shaft 98 is also fixed a bell crank lever 100, one end of which, through a link 101, is connected with an armature 102 of a solenoid 103 mounted on housing 56. Solenoid 103 is energized and de-energized through the circuit under control of the mercury switch 91 thereby causing the movements of armature 102 to control the operations of plate 92. The other end of said bell crank lever 100 carries a lug 104 which is moved and when said solenoid 103 is energized and armature 102 enters the same, will contact a finger 105 (Fig. 5) of pawl 69 and thereby disengage the latter from ratchet 68, thus allowing ball clutch 67 to engage the variable speed drive in housing 56 with shaft 64 which, as described heretofore is the driving means for movable rakes 47 and 65. Therefore, when the scale pan trips, mercury switch 91 causes the interruption of the circuit to stop the vibrations of hopper 34, and to de-energize solenoid 103, thus causing armature 102 to move upward, and effect the closing of the feed trough mouth by control plate 92. The de-energization of the solenoid also causes a disengagement of lug 104 from finger 105 of pawl 69. Since the latter is equipped with a tension spring 106, as soon as released the pawl will move into engagement with ratchet 68, causing ball clutch 67 on shaft 64 to disengage the latter from the variable speed drive and thereby also stop the motion of rakes 47 and 65.

Subsequent to the tripping of the scale pan, the measured quantity of tobacco is discharged therefrom and transferred into a compression magazine. The guide chute consists of a pair of adjustably mounted stationary side guide plates 109. The front and rear walls of the guide chute, consist of a movable magazine gate 110 and a movable end guide plate 111, the former and the latter moving in synchronism with each other. Plate 111 is fastened to a flange 112 mounted on a shaft 113 loosely supported in bearing lugs 114 (Fig. 9) of bracket 78. To shaft 113 is also fastened a lever 115 (Fig. 8) which through a link 116 is connected to a lever 117 mounted on a shaft 118 supported by means of bearing brackets 119 attached to magazine side rails 120 mounted on magazine bottom plate 121 supported by frame 122 secured to bed plate 20. To shaft 118 is fastened the magazine gate 110 which is operated by means of a lever 123 (Fig. 1) also mounted on shaft 118. Lever 123, through a rod 124, is connected to a lever 125 mounted on a shaft 126 (Figs. 1, 8, 13 and 14) supported by bearings of frame 122. Shaft 126 carries a lever 127 to which is fastened a crank pin 128 engaging with a slot 129 (Fig. 8) of an arm 130 attached to one end of a connecting rod 131 (Figs. 1 and 3). The other end of the connecting rod is pivoted to a cam lever 132 (Figs. 1 and 3) carrying a cam follower 133 engaging during a part of each cycle of the machine with a cam lug 134 (Fig. 3) fastened to the main driving gear 32.

The magazine is formed by the bottom plate 121, two adjustably mounted side plates 135 (Figs. 3 and 8), a stationary front end top plate 136 (Fig. 8), the magazine gate 110 which oscillates on shaft 118 and a stationary rear end top plate 137. Top plates 136 and 137 are mounted on and supported by side rails 120 fastened to bottom plate 121.

When the magazine is ready for a charge and the scale pan, holding the desired amount of tobacco is to be tripped, magazine gate 110 swings upward in the direction indicated by an arrow in Fig. 8. During this movement, magazine gate 110 with its free end engages a prong 138 on the scale receptacle 81, causing the latter to move from the scale plate 70, thereby permitting the tobacco in the scale pan to discharge into a funnel formed by the magazine gate 110, the end guide plate 111 and side guides 109. The plate 111, of course, due to its connection to gate 110 has followed the same during its upward movement. (Fig. 1 shows the scale pan open with the magazine gate standing in upright position and plate 111 swung towards the vertical gate 110.) This funnel shaped guide chute serves chiefly for the purpose of keeping the tobacco pieces in their longitudinal position which they assumed while being fed into the scale pan, described heretofore. As gate 110 swings downward again toward the magazine, plate 111 also rocks backward and away from the gate 110. In so doing the tobacco charge is evenly distributed and guided into the magazine. The scraping action of the end of gate 110 upon plate 111 during this downward movement transfers said tobacco charge in a most desirable manner and avoids the disturbing of the position of the tobacco pieces. When gate 110 has returned to its normal position a reciprocating plunger 139 operates to press the charge C into a waiting charge transfer (Fig. 8).

In order to prevent the scale pan from swinging upward as soon as its charge is released, the shaft 113 which carries back plate 111 is equipped with a lug 140 (Figs. 8 and 9) which, during the upward motion of gate 110 and plate 111, engages with a roller 141 pivoted to a lug 142 mounted on scale shaft 74, thereby holding the latter in an angular position and preventing the scale pan from swinging upward while the magazine is still open and the gate in an upright position. This arrangement has the object of preventing the hopper from starting to vibrate and from feeding a new charge before the magazine gate is closed. As gate 110 disengages from prong 138 of the scale receptacle, the latter, due to its own weight, will swing back and contact scale plate 70 again, thus making the scale pan ready to receive a new charge.

The scale is chiefly employed for the purpose of maintaining the right amount of tobacco in the magazine and of preventing over or under loading of the same. The guide chute has the object of guiding the tobacco charge from the scale pan into the magazine without changing the longitudinal positions of the tobacco pieces during this transfer operation.

The reciprocating plunger 139 which compresses the tobacco in the magazine is equipped with a plunger rod 143 slidably supported by an operating lug 144. To the free end of said plunger rod 143 is fastened a horizontal trip bar 145 (Figs. 8, 13 and 14) carrying on its free end an adjustable trip stud 146. The upper portion of operating lug 144 carries a turnable member 147 which on one end is equipped with a hand knob 148, while the other end is provided with a threaded extension 149 carrying a lug 150 slidably supporting in its lower portion the plunger rod 143. Operating lug 144 is equipped with a pair of studs 151 by means of which it is pivoted to a pair of brackets 152 mounted on an operating arm 153 pivoted to a crank pin 154 (Fig. 3) held by a crank 155 mounted on shaft 156 supported by bearing bracket 157 secured to the lower side of bed plate 20. Arm 153 is slidably supported by means of a guide lever 158 loosely mounted on cam lever shaft 159 supported by bearings of frames 21. Guide lever 158 is equipped with a cam lever 160 carrying a cam follower 161 engaging with a cam track 162 of cam 163 mounted on cam shaft 33.

While cam lever 160 imparts oscillating motion to guide lever 158 carrying the plunger operating arm 153, this motion of the lever is transformed into a reciprocating motion of arm 153 by the action of crank 155 connected to said arm by crank pin 154. For adjusting purposes the crank pin is eccentrically mounted on a suitable bearing of crank 155 (Fig. 3), thereby providing means for making extremely fine adjustments. Plunger 139 is actually reciprocated from arm 153 through lug 144 and member 147 by means of lug 150 which, during its forward stroke pushes against a spring 164 (Fig. 8) placed between said lug 150 and plunger 139. Said spring 164 is loosely wound around and supported by plunger rod 143. Spring 164 serves the purpose of taking care of any lost motion and permitting arm 153 to freely complete its stroke regardless of the amount of tobacco stored in the magazine, thus avoiding jamming in the magazine and assuring a more or less even amount of pressure of plunger 139 upon the tobacco column within the magazine during each forward stroke of said plunger. The backward stroke of plunger 139 is accomplished by means of lug 144 contacting bar 145 to which the free end of plunger rod 143 is fastened. The pressure of spring 164 upon plunger 139 can be changed to any desirable degree by turning of hand knob 148 of member 147, causing lug 150 to depress or release spring 164 (Fig. 8). This valuable and desirable feature permits the use of scrap tobacco of all types and sizes which may require a different pressure and density.

Figure 15:
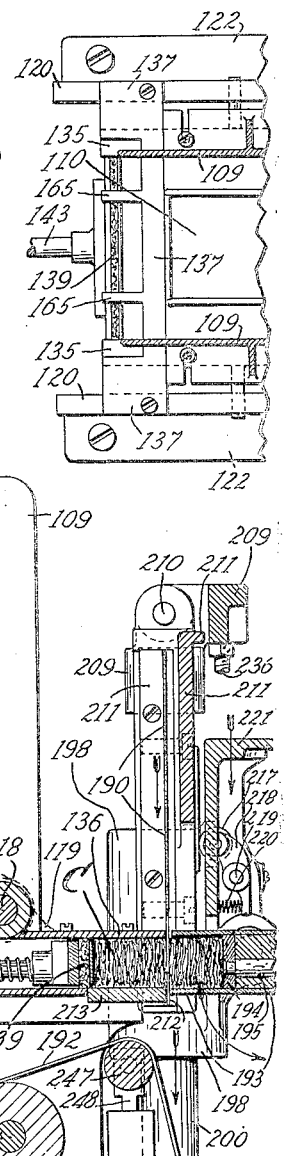
Fig. 15 is a partial plan view of the rear end of the magazine.

The rear end top plate 137 and the rear end of bottom plate 121 of the magazine (Fig. 8) are equipped with a number of fingers 165 (Figs. 8 and 15), provided for the purpose of allowing any tobacco which may be held by the plunger between the top and bottom plates to fall therefrom and be removed from the machine, thereby assuring that the plunger is kept clean at all times. In order to more positively remove such waste tobacco a funnel 166 (Fig. 8) attached to the rear end of the magazine and connected through a tube 167 to the pneumatic system of the machine conducts any tobacco pieces or dust deposited at the rear end of said magazine.

Trip stud 146 mounted on bar 145 is provided for the purpose of tripping or operating a control mechanism which is essential for checking the operation of the magazine gate 110 which in turn controls the discharge of tobacco charges from the scale pan to the magazine.

Figure 13:
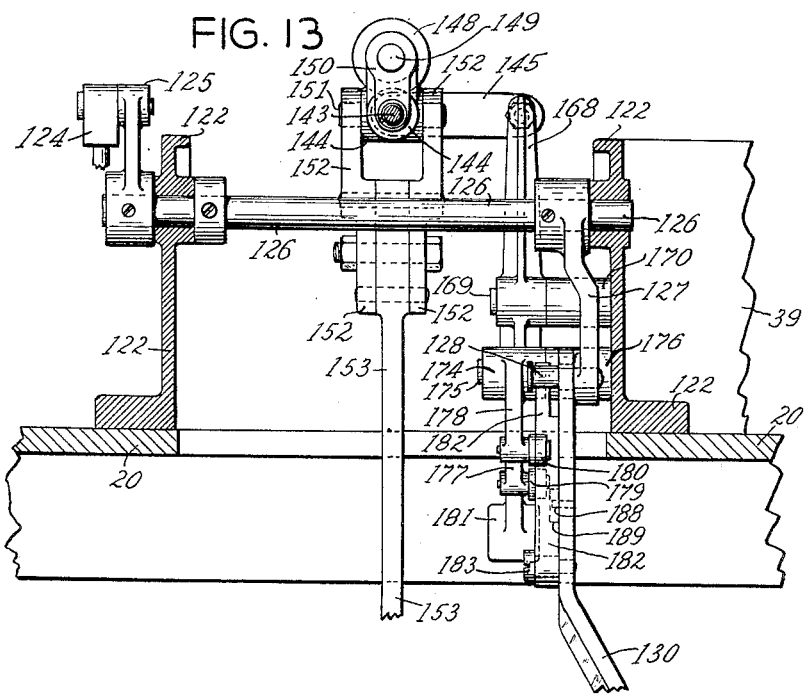
Fig. 13 is a sectional front elevation showing the magazine control mechanism.
Figure 14:
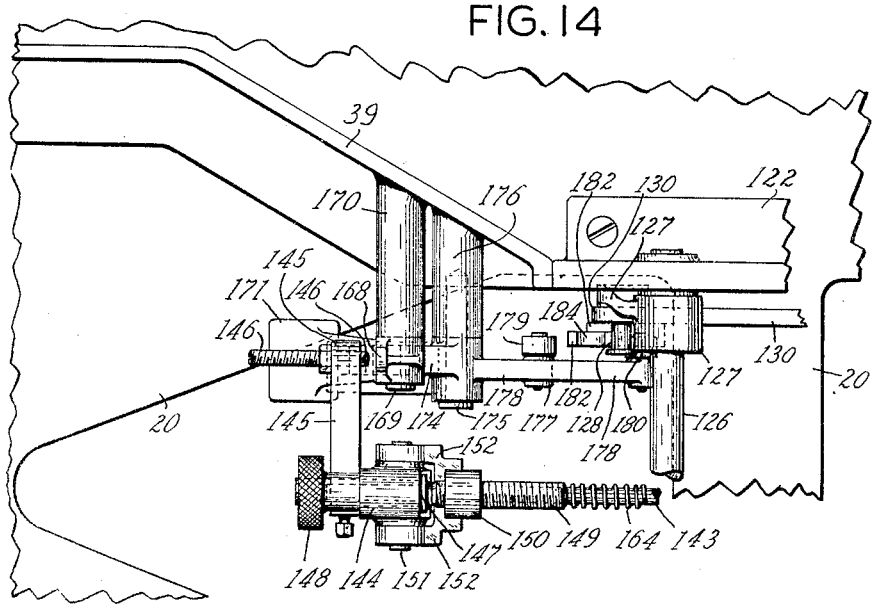
Fig. 14 is a plan view of the same.

This control mechanism, illustrated in Figs. 8, 13 and 14, consists of a vertical control lever 168 which stands upright in the path of trip stud 146. Lever 168 is pivoted to a stud 169 held by a hub 170 of supporting frame 39. This lever is equipped with a weight 171 and carries on its lower portion a latch lock 172 (Fig. 8) engaging with a latch 173 attached to a trip lever 174 pivoted to a stud 175 held by a hub 176 projecting from supporting frame 39 (Figs. 13 and 14). Trip lever 174 is part of a bell crank lever consisting of arms 177 and 178, to each of which is pivoted a follower 179 and 180, respectively. Arm 177 is furthermore provided with a weight 181. In the space between followers 179 and 180 protrudes a lock finger 182 which, by means of stud 183 (Fig. 8) is pivoted to arm 130, the free end of said lock finger also being provided with a recess 184.

When there is little or no tobacco in the magazine, the plunger 139 during its forward stroke can move substantially the entire length of the magazine and stud 145 will trip control lever 168 standing in the path of said stud since the latter is held by bar 145 which is mounted on the reciprocating plunger rod 143. The tripping of control lever 168 will cause the disengagement of latch lock 172 from latch 173 mounted on trip lever 174, thereby, due to weight 181, causing trip lever to swing in such a way that follower 179 on arm 177 strikes lock finger 182 and swings it about its pivot 183 to such position that the recess 184 of said finger is located directly beneath the crank pin 128. As arm 130, through cam lever 132 and connecting rod 131, during the next cycle of the machine moves upward again, recess 184 will engage with and seat crank pin 128 therein, and upon continued upward movement, lever 127 on shaft 126 is taken upward also, thereby rocking the magazine gate 110 to open the magazine to receive a measured charge of tobacco from the scale pan. After stud 146 trips control lever 168, which causes the disengagement of latch lock 172 from latch 173, plunger 139 returns to its extreme rear position and, due to weight 171, latch lock 172 comes to rest with its concave end surface 185 contacting the tripped latch 173. During the upward movement of arm 130 when recess 184 of finger 182 engages with crank pin 128 of lever 127, the side edge 186 of lock finger 182 comes against contact follower 179 on arm 177, thereby affecting an upward movement of trip lever 174 and causes a re-setting of latch lock 172 and latch 173. After the scale pan has delivered the charge to the guide chute and magazine, the gate 110 is closed again by the downward motion of arm 130, the slot 129 of which engages with the crank pin 128. During this downward motion, the other side edge 187 of lock finger 182 will contact the follower 180 of arm 178 (Fig. 8) and, since trip lever 174 is in locked position again, causes a disengagement of recess 184 of finger 182 from crank pin 128. In order to prevent lock finger 182 from swinging too far one way or the other during its contact with followers 179 or 180, arm 130 carries a stop pin 188 (Figs. 8 and 13) which engages with a slot 189 in finger 182.

The control mechanism, just described, must be tripped every time before the magazine gate can be opened to admit a tobacco charge delivered from the scale pan.

When during the operation of the machine, sufficient tobacco is present in the magazine, plunger 139 can enter only a short distance into the magazine and trip stud 146 of bar 145 on plunger rod 143 will not be able to engage and trip the control mechanism lever 168. In this case, as arm 130 moves upward finger 182 will not be rocked into position to seat pin 128 in recess 184 and hence lever 127 will not be moved to open gate 110. Slot 129 in arm 130 allows the latter to move upward without disturbance or action upon the crank pin 128 projecting through said slot. The magazine gate 110, of course, remains closed and will not move to open position until the magazine supply of tobacco reaches a point at which need for additional tobacco is communicated to and the control mechanism is tripped again.

During each forward stroke of plunger 139, the latter pushes the tobacco charge C into a charge transfer which, after the charge is cut off from the remaining tobacco column in the magazine by means of a vertically reciprocating knife 190, transfers said charge into a loop 191 of a rolling apron 192.

The tobacco charge transfer consists of a housing 193 having a slidable ejecting plunger 194 mounted on a single rod 195 slidably supported by said housing. To one end of housing 193 is fastened a stud 196, Figures 1 and 2, while to the other end of said housing is secured a stud 197. The latter is loosely supported in a bearing lug of guide sleeve 198 and stud 196 is loosely supported in a bearing lug of guide sleeve 199. The latter as well as sleeve 198 are slidably supported by means of a pair of vertical operating shafts 200, also slidably supported by means of bearings 201 (Fig. 2) of bed plate 20. Shafts 200 at their lower ends are connected by and mounted on a bridge bracket 202 which carries in its center portion a lug 203 to which is pivoted one end of a connecting rod 204, while the other end of the same is pivoted to a cam lever 205 carrying a cam follower 206 engaging with a cam track 207 of a cam 208 mounted on main cam shaft 33. Cam lever 205 is loosely mounted on shaft 159. Cam lever 205, through connecting rod 204 and bridge bracket 202, imparts vertical reciprocating motion to operating shafts 200. The upper ends of the latter are also connected by a bridge bracket 209 carrying by means of pivots 210, a knife supporting frame 211 to which is attached the knife 190. The cutting edge of the latter is slightly V-shaped and the lower portion of said knife is provided with two fingers 212 (Figs. 2 and 8) which are in steady contact with a ledger plate 213 (Figs. 3 and 8). The latter forms an extension of the magazine bottom plate 121 and is supported by the magazine frame 122.

In order to facilitate adjusting or setting of the ledger plate 213, each end of the latter is equipped with projections 214 (Fig. 3), each of which is contacted by a set of adjusting screws 215 (Fig. 1). Said screws 215 are supported by lugs 216 of magazine frame 122. In order to automatically take care of wear and tear and to assure a permanent and good contact of knife 190 with ledger plate 213, a pair of spring mounted rollers 217 may be employed. These rollers engage with knife supporting frame 211 at all times, and impart a steady tension upon knife 190. The novel knife mounting makes it possible to remove the knife for sharpening or replacement without tearing down the whole assembly. Also, because of its arrangement, any obstruction in the tobacco, such as a nail or other substance, will not break the knife, or otherwise damage the knife since it can flex out of the path of the obstruction thereby obviating cutting into this type of hard, unyielding substance. Because of the provision of a small gap between the top plate 136 and the top of housing 193, knife 190 has room to flex in the manner above described. Each of rollers 217 is pivoted to the forked portion of a lever 218, each of which is loosely mounted on a stud 219. The lower portion of each lever 218 is provided with a spring 220 (Fig. 8) supplying the tension to said rollers 217, thereby providing a better shearing action to the knife 190 upon ledger plate 213. One of the studs 219 is held by a lug of guide sleeve 198, while the other stud is held by a lug of guide sleeve 199. The latter is connected to sleeve 198 by means of a bridge frame 221.

Figure 2:
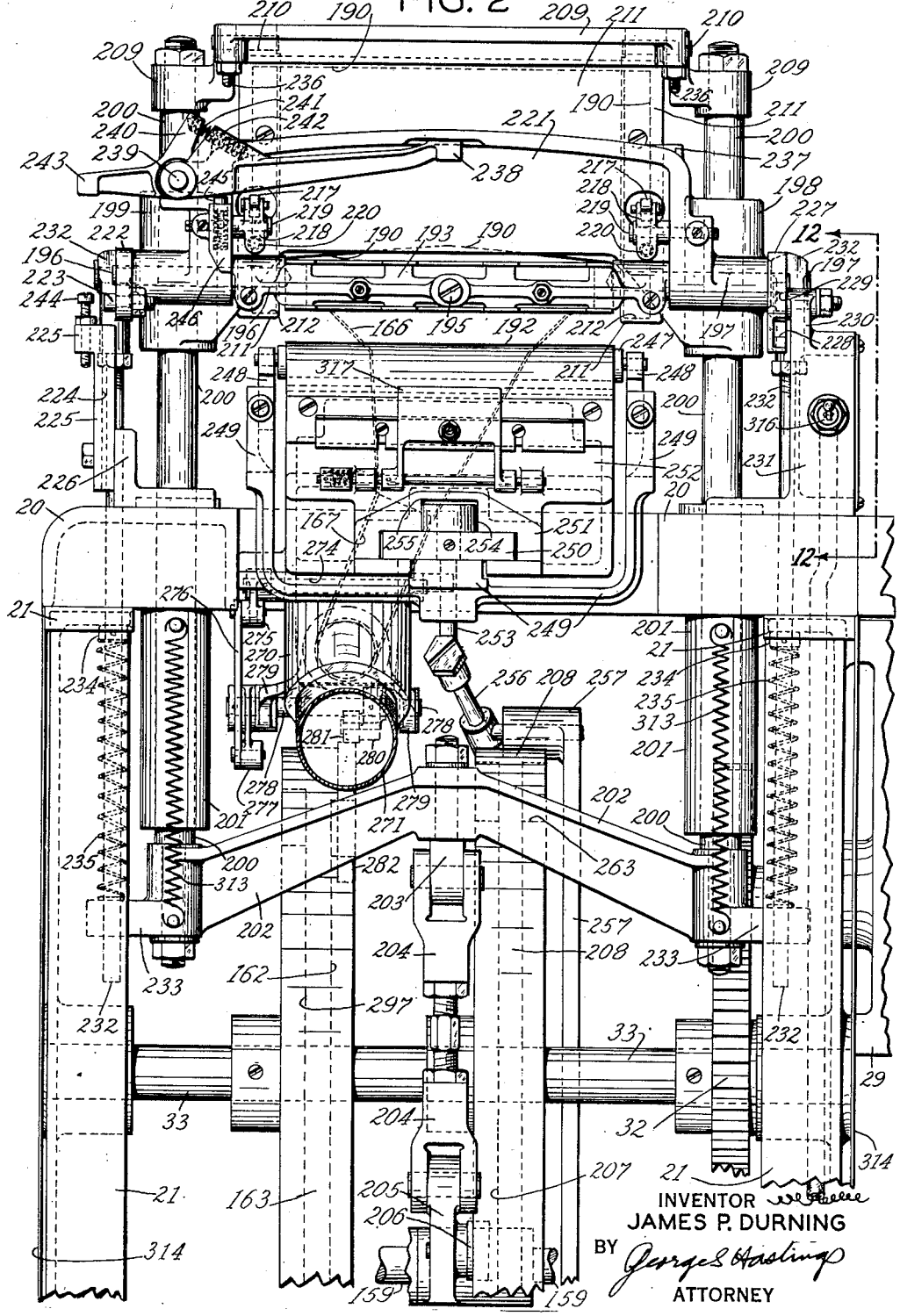
Fig. 2 is a front elevation of the knife, the transfer and the bunch rolling mechanisms and their respective drives, taken on line 2—2 of Fig. 1.

To stud 196 of transfer housing 193 is mounted a crank 222 (Figs. 1 and 2) carrying a crank pin 223 which, during operation engages with a vertical track 224 of a cam lug 225 held by a bracket 226 mounted on bed plate 20. To stud 197 of transfer housing 193 is mounted a cam lug 227 (Figs. 2 and 12) provided with a track 228 with which engages a stationary guide pin 229 held by a lug 230 of a switch housing 231 mounted on bed plate 20. To each of the guide sleeves 198 and 199 is pivoted a control rod 232 slidably supported by means of bed plate 20 and frames 21. The lower end of each of the vertical control rods 232 project through a lug 233 extending from each side of bridge bracket 202 (Fig. 2). Each of the rods 232 is provided with a stop collar 234. Around each control rod 232, between collar 234 and lug 233, is wound an expansion spring 235.

After the tobacco charge C has been pushed into transfer housing 193 by means of plunger 139, knife 190, by means of cam lever 205 and bridge bracket 202, is moved downward, thereby cutting the charge in the transfer from the tobacco column in the magazine. During this period the transfer will remain in its horizontal position while being held by springs 235 which expand during the downward motion of the bridge bracket 202 and hold rods 232 by means of collars 234 in their upmost position; rods 232 support and thereby control sleeves 198 and 199 which carry the transfer. During the downward motion of knife 190, but after the same has cut the tobacco charge C, a pair of vertically mounted, adjustable studs 236, held by bridge bracket 209, contact a pair of lugs 237 (Fig. 2) of the bridge frame 221, thereby forcing sleeves 198 and 199 to follow the downward motion of the knife mechanism, and naturally, causing the charge transfer to descend also.

During the downward motion of the sleeves and transfer, crank pin 223 of crank 222 enters the track 224 of cam lug 225, and cam track 228 of cam lug 227 which is mounted on stud 193 engages with stationary guide pin 229, thereby causing the transfer to move from a horizontal position to a vertical position by making an axial turn of 90°, after which the tobacco charge carried by the transfer is discharged into a loop 191 of a rolling apron 192 which may be of conventional design. In order to prevent any tobacco from sticking to or remaining in the transfer housing, a pusher arm 238 (Fig. 2) contacts the ejector rod 195, causing ejecting plunger 194 to move downward until the same is even with the outer walls of the transfer housing 193. Pusher arm 238 is pivoted to a stud 239 held by a lug of sleeve 199. To stud 239 is also pivoted a bell crank lever consisting of an arm 240 and an arm 243. Arm 240 is connected with a lug 242 of pusher arm 238 by means of a coil spring 241 (Fig. 2). Arm 243 extends horizontally from its support and, during the downward motion of sleeve 199, contacts an adjustable stud 244 held by the stationary cam lug 225, thereby causing arm 240, through spring 241, to press pusher arm 238 downward against ejector rod 195. A spring mounted plunger 245, slidably held by a lug 246 of sleeve 199 keeps arm 238 away from ejector rod 195, when arm 243 is not in contact with stud 244.

After the tobacco charge is deposited by the transfer into the apron loop 191, bridge bracket 202, through cam lever 205, moves upward again, which, of course, also affects an ascending of the transfer as well as of the knife 190. During this upward movement, cam lug 227, engaging with its track 228 with guide pin 229, and pin 223 trailing in track 224, swing the transfer again 90° from its vertical discharge position back to its horizontal receiving position. Either pin 223 or 229 is engaged in its respective cam track at some part of the cycle of the machine, thereby insuring that the movements of the transfer will always be positively controlled. A great feature of the operating means and construction of this transfer mechanism lies in the positive guide and supporting means the transfer has during any position or movement of the same.

After the tobacco charge is deposited into loop 191 of rolling apron 192, a horizontally reciprocating rolling pin 247 rolls said charge into a binder B (Fig. 1), thus forming a cigar bunch. Rolling pin 247 is pivoted at each end to a bearing lug 248 (Figures 1 and 2), each of which is adjustably mounted on a forked supporting bracket 249 fastened to a guide bar 250 slidably supported by means of a track formed by the lower portion 251 of a rolling table 252. Supporting bracket 249 and bar 250 carry a stud 253, to the upper end of which is pivoted a cam follower 254 engaging with a cam track 255 (Fig. 2) in portion 251 of rolling table 252. The lower end of stud 253, through an adjustable rod 256 is connected with an oscillating operating arm 257 (Figs. 1, 2 and 3) pivoted to a shaft 258 supported by bearings of frames 21. Arm 257 is provided with a lever 259 which, through an adjustable rod 260 is connected to a cam lever 261 carrying a cam roller 262 engaging with a track 263 of cam 208.

The rolling table 252 is mounted on bed plate 20 and is provided with a suction chamber 264 having a number of holes 265 (Fig. 1) leading to the rolling surface of said table 252. Said holes 265 of course, correspond with the customary perforations (not shown) in the rolling apron 192 upon which the binder B is placed by the operator. The suction chamber 264 is connected to a duct 266 formed by a channel 267 of bed plate 20 (Fig. 3) and a channel 268 of magazine frame 122. The bottom portion of channel 267 is provided with an opening 269 (Fig. 8) to which is fastened a valve 270 (Figs. 1, 2 and 8), which, through a tube 271, is connected to a conventional suction fan (not shown) supplying suction for the scrap bunch machine. Valve 270 is provided with an outlet 272 (Fig. 8) to which is connected the conduit 167 leading to funnel 166 attached to the rear end of the magazine. Valve 270 is also provided with a shutter plate 273 (Figs. 1, 2 and 8) mounted on a shaft 274 supported by bearings in said valve. To shaft 274 is fastened a lever 275 which, through a link 276, is connected with a lever 277 mounted on a shaft 278 supported in bearing lugs 279 (Fig. 2) of valve 270. To shaft 278 is also fastened a lever 280 to which is pivoted a roller 281 hanging in the path of a cam piece 282 attached to cam 163. When roller 281 engages with cam piece 282, lever 280 is moved upward and thereby causes shutter plate 273 to move upward and to close the opening 269 of the suction channel 266 which leads to the suction chamber of the rolling table. When opening 269 is closed by shutter plate 273 the suction supply to the rolling table is shut off, but is then directed through outlet 272 and conduit 167 to the rear end of the magazine. The plunger 139 is then in its backmost position. As soon as roller 281 leaves the cam piece 282, shutter plate 273 drops, thereby clearing opening 269 and closing outlet 273, thus directing all suction through channel 266 to the rolling table, while the suction supply to the rear end of the magazine is entirely cut off.

One end of the rolling apron is fastened to the front end of the rolling table 252, while the other end of said apron is fastened to an apron drum 283. The latter is provided for the purpose of controlling the action of the apron during rolling operation and through proper adjustment a tight or loose wrapping of the bunch can be achieved. The apron drum 283 may be constructed and operated in the same manner as the apron take-up mechanism disclosed in Letters Patent No. 1,442,200 granted January 16, 1923, to V. J. Wahlstrom.

Apron drum shaft 284 engages with an adjusting head 285 (Fig. 3) which is equipped with a shaft 286 carrying a sprocket 287 connected by means of a chain 288, with a sprocket 289 pivoted on a shaft 290 supported by an arm 291 adjustably mounted on a stud 292 (Fig. 1) held by a hub on one of the main supporting frames 21. Chain 288 is hooked to an arm 293 (Figs. 1 and 3) pivoted on shaft 159. Arm 293 is provided with a weight 294 and is equipped with a cam lever 295 which carries a cam roller 296 engaging with a track 297 of cam 163.

The machine is equipped with an automatic stop switch 298 (Figs. 1 and 3) in order to stop the entire machine after the completion of each cycle of the same. This switch is mounted on a bracket 299 and is operated by means of a spring mounted roller 300 projecting from said switch in the path of a cam lug 301 attached to cam 163. Upon contact of cam lug 301 with switch roller 300, the latter, by means of switch 298, causes a break of the electric circuit, which de-energizes a solenoid 302 mounted on housing 29 (Fig. 3). The armature (not shown) of solenoid 302 is connected with and operates the main clutch (not shown) of the machine supported in housing 29. The clutch preferably is of the same construction and design as that disclosed in patent application No. 183,405 filed January 5, 1938, by Henry H. Wheeler.

In order to start the machine again, the operator must depress a foot pedal 303, causing a stud 304 on an arm 305 to press against a switch button 306 which will actuate switch 298 and thereby close the circuit again. Foot pedal 303 and arm 305 are pivoted on shaft 258. An expansion spring 307 (Fig. 1), anchored between bracket 299 and arm 305, assures the return of the arm and foot pedal, after the operator releases the latter. Arm 305 is also provided with a stop screw 308 (Fig. 1) to limit the upmost movement of the arm 305. Bracket 299 is supported by means of shaft 258 and a shaft 309 held by frames 21.

On switch bracket 299 is also mounted a limit switch 310 operated by means of a projecting spring mounted roller 311 (Fig. 3) contacting a cam lug 312 attached to cam 208. This limit switch 310 is installed for the purpose of preventing operation of the hopper 34 before the scale has come to a complete rest, thus preventing starting and stopping of the vibration while the scale pan is still moving.

The machine is also equipped with a pair of balance springs 313 (Fig. 2) anchored to the bridge bracket 202 and bearing 201. These springs are installed for the purpose of preventing the weight of the knife and transfer mechanisms acting upon bridge bracket 202, from forcing cam lever 205 and roller 206 to ridge ahead of the desired cam motion.

In order to prevent the accumulation of dust in the various mechanisms, the machine is equipped with a number of shielding plates 314. For ready accessibility to the plunger and gate control mechanisms, the rear end of the hopper supporting frame 39 (Fig. 4) is provided with a hinged door 315. The machine may be also stopped by operating a manual switch 316 (Fig. 2), mounted on switch housing 231. The rolling table 252 is equipped with a spring mounted, adjustable bunch holding finger 317 (Fig. 1) into which the bunch is delivered by the rolling apron 192.

In Fig. 16, a schematic wiring diagram of the electrical system of the machine is shown. By means of switch S, current is conducted from a suitable line to motor 22 which has a drive shaft 24 mounting a pulley 25 which through belt 26 engaging pulley 27 (Fig. 3) drives the shaft 28 which mounts the pulley 27. The current for operating the several electrical elements of the machine flows through a circuit controlled by a manual switch 316. Referring to Fig. 16, it will be seen that one side of the coil of relay R is connected to one side of the line from wire 317. The other side of the coil of relay R is connected through wire 321, mercury switch 91 (which is mounted on shaft 74 of the scale pan as described hereinbefore), wire 322, limit switch 310 and wire 319 to the manual control switch of the circuit. The coils of vibrator magnet 43 and the rake control solenoid 103 are connected in multiple, one side being connected to wire 322, as shown in Fig. 16, the other side being connected to one side of the contact of relay R. The other side of the relay contact is connected to line wire 317.

One side of the coil of clutch solenoid 302 is also connected to the line through wire 317, the other side is connected through wire 320, limit switch 298 and wire 319, to the manual control switch 316. Foot control switch 306 is connected in multiple with limit switch 298.

In the usual operation of the machine, the current through coil 302 will be interrupted once during each cycle of the machine by limit switch 298 which is provided with a cam follower 300 adapted to engage with cam 163 mounted on shaft 33, having thereon a cam lug 301 so that at the conclusion of each cycle of operation of the machine, lug 301 breaks the contact of switch 298, opens the circuit, and through solenoid 302 discontinues the operation of the machine and hence brings the entire machine to a stop. To restart the machine or to maintain it in continuous operation at the will of the operator, regardless of the automatic operation of limit switch 298, a manual control is provided in the form of switch 306 which forms a part of treadle mechanism 303, the switch being mounted upon an adjustable rod 304, carried on arm 305 of the foot pedal lever 303 which is mounted on rod 258. Hence, by depressing foot pedal 303, solenoid 302 is energized regardless of the operation of the limit switch 298 and the machine performs its designed functions.

Mercury switch 91, which is mounted on shaft 74 of the scale pan mechanism, is in circuit closing position when the scale pan is empty and returned to its tobacco receiving position after the disengagement of cam 140 and cam follower 141 (Fig. 8). The coil of relay R is not energized, however, until limit switch 310 completes the circuit. The cam 208 is provided with a cam lug 312 which engages with cam follower 311 of a limit switch 310, and is timed in such a manner that the scale pan can come to rest in its tobacco receiving position, as above mentioned, before switch 310 closes, in order to prevent possible double action of relay R due to bouncing of the scale pan. The contact of relay R in turn completes the circuit to the vibratory magnet 43 through wire 323 and the rake solenoid 103. When the scale pan tips and swings the mercury switch 91 into open circuit position, relay R is de-energized and in turn interrupts the operation of the vibratory magnet and causes the de-energization of the rake solenoid 103. This action causes a cessation of feed of tobacco from the hopper 45 and of the movement of rakes 47 through which tobacco is fed for discharge from the hopper into the scale pan.

The invention above described may be varied in construction within the scope of the claims for the particular device selected to illustrate the invention is but one of many concrete embodiments of the same. The invention is not, therefore, to be restricted to the precise details of the structure shown and described.

What is claimed is:

1. Mechanism for feeding tobacco and like materials comprising a hopper, means for confining a supply of tobacco in said hopper, comprising a plurality of sets of rakes lying in substantially vertical different planes located for movement transversely of said hopper, one of said sets of rakes being provided with fingers of differing lengths, and means for adjusting the length of the shorter fingers of said set.

2. In a cigar machine, the combination with a tobacco feeding hopper adapted to contain a supply of tobacco, of a measuring device located adjacent one end of said hopper, means for vibrating said hopper to feed tobacco into said device, control means associated with said device for interrupting the feed of tobacco thereto, a compression chamber located beneath said device, a trap door forming part of said chamber, means for moving said door to effect the discharge of tobacco from said device, and means controlled by the movement of said trap door for preventing further feed of tobacco to said device until said trap door returns to closed position.

3. In a cigar machine, a weighing device, means for intermittently feeding tobacco to said device, means for setting the capacity of said device, a compression chamber located beneath said device and arranged to receive weighed charges therefrom, a trap door normally closing said compression chamber, means for raising said trap door to effect the discharge of tobacco from said device into said chamber, means for interrupting the feed of tobacco to said device when its set capacity has been reached, and means controlled upon movement of said trap door to closed position for preventing the feed of tobacco to said device until said door has been moved to normally closed position.

4. In a cigar machine, the combination with mechanism for feeding tobacco to a bunch forming device, of a source of supply of tobacco, a weighing receptacle of wedge shape cross section located adjacent said source and constructed and arranged to align tobacco pieces fed thereinto, said receptacle including a pivoted tilt member, a trip finger mounted on said member, a compression chamber located beneath said receptacle, a trap door normally closing said chamber, and means for moving said trap door to engage said finger and eject the charge of tobacco from said receptacle into said chamber.

5. In a cigar machine, the combination with mechanism for feeding tobacco to a bunch forming device, of a source of supply of tobacco, a weighing receptacle of wedge shape cross section located adjacent said source and constructed and arranged to align tobacco pieces fed therein, said receptacle including a pivoted tilt member, a trip finger mounted on said member, a compression chamber located beneath said receptacle, a trap door normally closing said chamber, means for moving said trap door to engage said finger and dump the charge of tobacco into said chamber, and a distributing plate movable in synchronism with said trap door to receive tobacco discharged from said receptacle and distribute it in said chamber.

6. In a cigar machine, the combination with mechanism for feeding tobacco to a bunch forming device, of a source of supply of tobacco, a weighing receptacle of wedge shape cross section located adjacent said source and constructed and arranged to substantially align tobacco pieces fed thereinto, said receptacle including a pivoted tilt member, a trip finger located on said member, a compression chamber located beneath said receptacle, a trap door normally closing said chamber, means for moving said trap door to engage said finger and dump the charge of tobacco into said chamber, and a locking member mounted for conjoint operation with said door to prevent the feed of additional tobacco to said receptacle until the same has been returned to closed position.

7. In a cigar machine, the combination with a compression chamber, of means movable in said compression chamber for compressing charges of tobacco to a predetermined density, a trap door normally closing said chamber, a weighing device located above said compression chamber, means for intermittently feeding tobacco to said weighing device, means for moving said trap door to open said chamber and coact with said device for guiding and discharging a weighed charge of tobacco from said device, a distributing plate mounted for independent movement beneath said device, and means for moving said distributing plate into the path of tobacco discharged from said device to receive and distribute said tobacco in said chamber.

8. In a cigar machine, the combination with a charge measuring chamber, a plunger movable therein, and a trap door normally closing said chamber, of means for reciprocating said plunger at least once during each cycle of the machine, means for controlling the feed of tobacco to said chamber, said means including a trip finger carried by said plunger, a trip latch arranged to be engaged by said finger whenever the supply of tobacco in said chamber reaches a predetermined quantity, and mechanism made operable by the tripping of said latch for opening said door and feeding additional tobacco to said chamber, said mechanism including a crank arm connected for operating said door, a pin carried on the free end of said arm, a link having a slotted end, in which slot said pin rides, and a recessed finger pivotally mounted on said link adjacent the slotted end thereof, a cooperating latch member and a cam follower mounted on said member for engaging said finger to position said recess under said pin whereby said link will rock said crank and open said door.

9. In a cigar machine, the combination with a charge measuring chamber, a plunger movable therein, and a trap door normally closing said chamber, of means for controlling the feed of tobacco to said chamber, means for reciprocating said plunger at least once during each cycle of the machine, a trip finger carried by said plunger, a trip latch mechanism arranged to be engaged by said finger whenever the supply of tobacco in said chamber reaches a predetermined quantity, and means made operable by the tripping of said latch for opening said door and feeding additional tobacco to said chamber, said last means including a crank arm connected for operating said door, a pin carried on the free end of said arm, a link having a slotted end, in which slot said pin rides, and a recessed finger pivotally mounted on said link adjacent the slotted end thereof, a cam follower mounted on said mechanism for engaging said finger to position said recess under said pin whereby said link will rock said crank and open said door, means arranged to engage and unseat said finger thereby to interrupt the feed of additional tobacco, and means for resetting said latch mechanism.

10. In a cigar machine, the combination with a charge measuring chamber and means for feeding tobacco thereto, of a plunger movable in said chamber to compress tobacco to a predetermined density therein, a gate normally closing said chamber against the feed of additional tobacco, means under the control of said plunger for opening said gate and means operable by said gate for thereby effecting the feed of additional tobacco to said chamber whenever the tobacco in said chamber reaches a predetermined quantity.

11. In a cigar machine, the combination with a charge measuring chamber and means for feeding tobacco thereto, of a plunger movable in said chamber to compress said tobacco to a predetermined density, a gate normally closing said chamber, mechanism under control of said plunger for opening said gate to allow additional tobacco to be fed to said chamber, said mechanism comprising, a trip latch lever, and a trip finger on said plunger, means for moving said plunger to cause said finger to engage said latch when tobacco is needed in said chamber, means for operating said gate, means made operable by the tripping of said latch to cause said gate operating means to open said gate and means operated by said gate for feeding additional tobacco to said chamber.

12. In a cigar machine, means for feeding tobacco, a device for weighing predetermined quantities of tobacco, a measuring chamber having a tobacco feed opening, a gate normally closing said opening, and means for preventing feed of additional tobacco to said device unless said gate occupies its normal closed position.

13. In a cigar machine, means for feeding tobacco, a device for weighing predetermined quantities of tobacco, a measuring chamber provided with a feed opening, a gate normally closing said opening, and means for preventing the feed of additional tobacco to said device unless said gate occupies its normal closed position, said means comprising an electric circuit, a switch in said circuit carried by said device, a cam follower on said device, a cam associated with said gate, and arranged to engage with said follower to maintain said switch open whenever said gate is in open position.

14. In a cigar machine, a tobacco feed hopper, means for vibrating said hopper to feed tobacco therefrom, a tobacco, weighing device, a measuring chamber provided with a feed opening, a gate normally closing said opening, and means for preventing the feed of additional tobacco to said device unless said gate occupies its normal closed position, said means comprising an electric circuit, and means for keeping said circuit open and said vibrating means inoperative whenever said gate fails to close said opening.

15. A device for use in a tobacco feeding mechanism comprising a plurality of rake members provided with sets of spaced fingers, means mounting said members for movement in closely spaced substantially vertical parallel planes, and means for imparting relative movement to said members to move at least one of said sets of fingers back and forth past the other to produce a controlled feeding of tobacco between the ends of each rake member only between the fingers of each rake member.

16. In a cigar machine, a tobacco receiving device, means for intermittently feeding tobacco to said device, a compression chamber located beneath said device and arranged to receive charges therefrom, a movable member normally closing said compression chamber, means for moving said member into engagement with said device to effect the discharge of tobacco therefrom into said chamber, and means for preventing the movement of said device relative to said member while said member is effecting the discharge of tobacco from said device into said chamber.

17. In a cigar machine having mechanism for feeding tobacco to a bunch forming device, and a source of supply of tobacco, a receiving receptacle, means mounting said receptacle for movement beneath said source of supply to start and stop the feed of tobacco thereto, a pivoted plate carried by said receptacle normally biased into receptacle closing position, a pivot for said plate carried by said receptacle, a tobacco receiving chamber positioned to receive tobacco from said receptacle, means on said chamber for opening said receptacle whenever tobacco is to be fed to said chamber, and means for locking said receptacle against movement on its pivot while the tobacco is being discharged therefrom.

18. Tobacco feeding mechanism for a cigar machine comprising a tobacco receiving chamber, a movable member normally closing said chamber against the introduction of tobacco, a normally closed receiving device located above said chamber, and means carried by said receiving device and constructed and arranged to be engaged by said member to open said device and effect the discharge of tobacco therefrom into said chamber.

19. Tobacco feeding mechanism for a cigar machine comprising a charge compression chamber, a movable member normally closing said chamber against the introduction of tobacco, a tobacco receiving device located above said chamber, means carried by said device and constructed and arranged to be engaged by said member for discharging tobacco from said device into said chamber, and a guide member associated with said member and movable simultaneously therewith away from said movable member for distributing the tobacco discharged from said device in said open chamber.

20. In a cigar machine, a hopper adapted to hold a supply of tobacco suitable for supplying said machine for a substantial period of time, mechanism for confining said supply of tobacco in said hopper comprising a support mounted above said hopper, a plurality of sets of rakes pivotally mounted on said support and depending above said hopper, each of said sets having spaced elongated tobacco engaging members, a rake driving shaft located in said support, driving connections between said rakes and shaft, means for vibrating said hopper to advance said tobacco against said rakes whereby said supply of tobacco is held back by said rakes, and means operative while said hopper is being vibrated for driving said shaft to move one of said sets past the other to feed limited quantities of tobacco from said supply between said members.

21. A tobacco feeding mechanism for a cigar machine comprising a receptacle having a generally horizontal part constructed and arranged to support a bulk mass of tobacco sufficient to supply said machine for a substantial period of time, and an integral generally horizontal tobacco receiving and feeding part located in a plane generally parallel to said first-named part and therebelow, and an integral substantially vertical shoulder joining said parts, a plurality of open members each having a plurality of spaced fingers mounted above said feeding part to permit the movement of tobacco therebetween and located adjacent said shoulder with portions thereof below said first named part and adjacent said second named part for holding back said mass of tobacco on said first named part, and means for effecting relative movement between said receptacle and members to advance said entire mass of tobacco against said members whereby said members hold back said mass of tobacco against uncontrolled movement of said receptacle, and means for imparting independent movement to said members to move the same back and forth past each other in front of said shoulder to effect the feed of tobacco only through said fingers from said first-named part onto said second-named part.

22. In a cigar machine a substantially horizontal open trough shaped storage receptacle having an open feeding end constructed and arranged to contain a bulk mass of short filler tobacco capable of supplying said machine for a substantial period of time, means for advancing said mass of tobacco in a generally horizontal direction towards said open end, a series of movable members supported within said receptacle and extending substantially transversely thereof for preventing movement of said mass of tobacco therefrom, means for mounting said members in closely spaced different parallel planes for movement only transversely across the face of said mass of tobacco held back thereby therebetween to control the movement of limited quantities of tobacco therebetween, a charge forming chamber, a movable door normally closing said chamber, means for opening said door to receive tobacco fed by said members from said receptacle, and means for stopping the movement of said members and advance of tobacco when a predetermined quantity of tobacco has been fed from said supply.

23. An open tobacco feeding hopper comprising, a bottom material supporting section, back and side walls extending upward from said bottom and forming therewith a material enclosing area constructed and arranged to hold a bulk supply of tobacco sufficient to make a plurality of cigars, and a discharge area lying in a plane inclined downwardly from the horizontal, said bottom of said holding portion of said hopper being transversely and downwardly curved between said side walls and lying in a plane inclined downwardly from the horizontal in a direction opposite to the inclination of said discharge area, a distributing lip formed on the discharge end of said discharge area, and a single integral substantially vertical downwardly curved connecting shoulder joining said holding and discharge areas of said bottom extending transversely across the bottom of said hopper and separating said areas into surfaces lying in different planes.

24. A material feeding mechanism comprising, an open receptacle provided with an elongated bottom and material enclosing upstanding back and side walls constructed and arranged to hold a bulk supply of tobacco upon said bottom and within said walls, means for mounting said receptacle to support it with the bottom therein in a substantially horizontal plane, said bottom being provided with a single downwardly curved transverse connecting shoulder forming an integral part of said hopper, and dividing said hopper bottom into a portion wherein that portion of the bottom bounded by said side and back walls is inclined downwardly and rearwardly from a horizontal plane towards said back wall and downwardly curved between said side walls and a bottom tobacco feeding portion lying in a plane below said first-named bottom portion and over which a stream of tobacco may be fed, said feeding portion being downwardly inclined from a horizontal plane in a direction opposite to the inclination of said first named portion, a discharge lip formed on said feeding portion, and means for vibrating said hopper to feed tobacco therefrom.

25. A material feeding hopper of the vibratory type comprising, a receptacle provided with back and side walls rising substantially vertically from an elongated bottom surface having a discharge section and an integrally connected tobacco holding section arranged at an angle inclining downwardly and rearwardly from a horizontal plane between said side walls towards said back wall to contain a mass of tobacco, a single transverse shoulder forming an integral part of said hopper bottom positioning said tobacco holding section vertically above said discharge section, said surface of said discharge section being inclined downwardly from a horizontal plane in a direction opposite to the inclination of said holding section, means for resiliently supporting said hopper, and means for intermittently vibrating said hopper and the mass of tobacco therein to feed a stream of tobacco with rectilinear pulsations up the incline of said holding section and onto and over said discharge section.

26. In a cigar machine, the combination with a hopper adapted to contain a bulk supply of tobacco sufficient to supply said machine for a substantial period of time, a plurality of sets of spaced parallel feeding members lying in substantially vertical planes mounted for movement relative to said hopper holding back said supply of tobacco therein, means for moving said members back and forth past each other across said hopper, and means for vibrating said hopper during said movement of said members to feed tobacco therefrom, of a measuring device adjacent said hopper arranged to receive tobacco fed therefrom, and means for stopping the movement of said members and said hopper when the capacity of said device has been reached.

27. In a cigar machine tobacco feeding mechanism, a receptacle provided with tobacco enclosing walls constructed and arranged to hold a bulk mass of tobacco sufficient to supply said machine for a substantial period of time, said receptacle having an open discharge end and a rigid bottom supporting and feeding surface, said surface having a transverse shoulder formed therein and constructed and arranged to divide said receptacle into tobacco confining and feeding sections, movable rakes positioned above said surface adjacent said shoulder and extending below the level of said supporting surface for holding back said supply of tobacco on said supporting surface and controlling the feed of tobacco from said receptacle, and means for moving said rakes back and forth across said hopper and past each other to separate tobacco from said mass held in said hopper for delivery therebetween onto said feeding surface.

28. In a cigar machine, the combination with mechanism for feeding tobacco, comprising a hopper including a receptacle provided with separate tobacco holding and discharge sections connected by an integral transverse shoulder, an open discharge end, of means for feeding tobacco therefrom, including hopper vibrating mechanism, and oppositely movable oscillating rakes lying in substantially vertical different planes located between said sections and proximate said shoulder and having portions thereof below said holding section moving at right angles to said opening for holding said tobacco in said holding section and controlling the feed thereof from said hopper.

29. A tobacco feeding mechanism for a cigar machine, comprising a hopper including a receptacle provided with a generally horizontal tobacco confining surface supporting a mass of tobacco and a discharge surface connected to said confining surface over which tobacco is fed in limited amounts therefrom, an open discharge end, and means for feeding tobacco therefrom, including substantially parallel sets of vertical oscillating rakes having tines located above said surfaces and driving means for moving said rake tines at right angles to the path of movement of said tobacco back and forth past each other for controlling the feeding of tobacco from said hopper.

30. In a cigar machine having a device for forming bunch charges of tobacco; mechanism for feeding tobacco comprising a hopper adapted to contain a supply of tobacco suitable for supplying said machine for a substantial period of time, means for feeding tobacco from said hopper including, means for vibrating said hopper, a plurality of oppositely movable rakes having tines constructed and arranged to move in substantially vertical parallel planes transversely to said hopper for controlling the feed of and separating the tobacco from said supply, and means for operating said rakes while said hopper is vibrating to move said tines back and forth past each other and thereby effect the feed of a substantially uniform stream of tobacco from said hopper for delivery to said device.

31. In a cigar machine having a charge forming forming device; the combination with a hopper provided with a delivery outlet adapted to contain a supply of tobacco sufficient to supply said machine for a substantial period of time, of means for feeding a stream of tobacco from said hopper, said means including a plurality of movable rakes having fingers positioned in substantially parallel different vertical planes located above and transversely of said hopper and constructed and arranged to hold back said entire supply against movement of tobacco therefrom, and means for moving said rakes oppositely to each other in said parallel substantially vertical planes to cause said fingers of one of said rakes to move past said fingers of the other of said rakes and thereby allow a stream of tobacco to be fed from said supply.

32. In a cigar machine, an open hopper adapted to hold a supply of short filler tobacco suitable for supplying said machine for a substantial period of time, said hopper having an approximately horizontal supporting surface, means for confining said entire supply of tobacco in said hopper and regulating the movement of tobacco from said hopper, said means comprising a support mounted above said hopper, a plurality of sets of rakes mounted on said support and depending therefrom above said surface, each set comprising a plurality of spaced substantially vertical members engaging said tobacco transversely across said hopper to hold the tobacco therein, a rake drive shaft, driving connections between said rakes and shaft, and means for moving said sets of rakes relative one to the other only in planes transversely of the direction of feeding movement of tobacco from said hopper to allow tobacco to be fed from said hopper during the movement of said members.

33. In a cigar machine bunch forming mechanism, a tobacco feeding device comprising a hopper provided with an elongated bottom feeding and supporting surface lying in a substantially horizontal plane, said surface being provided with a vertically offset integral connecting shoulder constructed and arranged to divide said surface into approximately horizontal vertically spaced confining and feeding surfaces, and a plurality of vertical rakes extending across said hopper confining tobacco on said hopper operable proximate and in front of said shoulder and above and closely adjacent said feeding surface, and means for oscillating said rakes back and forth across said hopper and one past the other to distribute tobacco onto said feeding surface.

34. In a cigar machine bunch forming mechanism, a device for feeding measured quantities of tobacco thereto, comprising a hopper provided with an elongated bottom supporting and feeding surface lying in a substantially horizontal plane, said surface being formed with vertically offset substantially horizontal bottom portions joined by a transverse shoulder dividing said hopper into a confining section and a delivery section, a plurality of rakes having portions thereof located below said confining section confining tobacco in said confining section of said hopper operable in front of said shoulder and above said delivery section, means for oscillating said rakes back and forth across said hopper to distribute tobacco onto said delivery section, and means for simultaneously agitating said hopper to feed said tobacco against said rakes for delivery therethrough onto said feeding surface.

35. In a cigar machine having mechanism for feeding measured charges of tobacco, a generally horizontal trough shaped hopper provided with an elongated bottom surface having a downwardly and transversely curved portion, means for yieldingly mounting said hopper, means for imparting vibratory movement to said hopper, and a device for holding a mass of tobacco in said hopper, said device including a plurality of relatively movable sets of substantially vertical rakes mounted above said hopper extending transversely across said trough of said hopper and constructed and arranged to move in a path parallel to said curved portion, and mechanism for operating said vibratory means and rake device simultaneously to separate tobacco from said mass for delivery from said hopper.

36. In a cigar machine having a device for forming cigar bunches; mechanism for feeding tobacco comprising a hopper provided with an approximately horizontal elongated tobacco holding and feeding bottom surface, means for discharging tobacco from said hopper to said device, said means including a plurality of sets of substantially vertical relatively movable rakes having tobacco engaging portions holding said tobacco in said hopper, a support for said rakes, means for moving said hopper to advance said tobacco against said rakes, means journalled in said support for moving said tobacco engaging portions of said rakes in parallel planes back and forth adjacent said bottom surface past each other across the face of said confined tobacco during the movement of said hopper to control the feeding of tobacco through said rakes and from said hopper, and means for controlling the speed of movement of said rakes to control the feed of tobacco from said hopper.

37. In a cigar machine provided with a bunch forming device; a generally U-shaped hopper having a tobacco supporting and feeding surface, means for holding a bulk supply of tobacco sufficient to provide said machine for a substantial period of time in said hopper against uncontrolled movement therefrom, and comprising a plurality of sets of rakes consisting of spaced fingers located directly above said surface for movement transversely of said hopper, the fingers of one of said sets of rakes being of differing lengths, and means for moving said sets of rakes back and forth past each other to separate tobacco from said supply of tobacco.

38. In a cigar machine having a cigar bunch forming mechanism, a hopper for feeding tobacco to said mechanism, a plurality of rakes comprising spaced confining members for holding in said hopper a quantity of tobacco sufficient to supply said machine for a substantial period of time, said members being located in said hopper for movement transversely thereof in substantially vertical different parallel planes past each other, means for intermittently feeding tobacco from said hopper, including mechanism for vibrating said hopper and entire quantity of tobacco held therein to advance said tobacco against said members, means operable simultaneously with the vibration of said hopper for intermittently driving said rakes to move said members in said planes across the face of said mass of tobacco advanced against said members to control the feed of tobacco from said hopper between said members, and means operative when a sufficient quantity of tobacco has been fed from said hopper to stop the vibration of said hopper and movement of said rakes.

39. In a cigar machine, a receptacle adapted to contain a bulk supply of tobacco sufficient to supply said machine for a substantial period of time and a plurality of members movable past each other in and relative to said receptacle and in a plane transverse thereto for holding said supply of tobacco in said receptacle and separating tobacco to be fed therefrom, mechanism for vibrating said receptacle to feed tobacco to said members, and means for moving said members when tobacco is being fed from said receptacle, a measuring device adjacent said receptacle and arranged to receive tobacco therefrom, and means under control of said device for bringing the movement of said receptacle and members to a halt, said means including a control on said device rendered operable when the feed capacity of said device has been reached.

40. In a cigar machine, the combination with mechanism for feeding tobacco comprising a vibratable member adapted to contain a supply of short filler tobacco sufficient to operate said machine for a substantial period of time, and a plurality of spaced sets of movable feeding elements lying in substantially vertical different parallel planes holding said entire supply of tobacco against uncontrolled movement from said member and coacting therewith to feed a stream of said tobacco therefrom, of a device for receiving and measuring tobacco fed from said mechanism between said elements, said device including a scale pan composed of a plurality of relatively movable parts, means for controlling the capacity of said pan, means for simultaneously virbrating said source of supply to advance said supply against said elements and moving said elements back and forth past each other relative to said source of supply to separate tobacco from the face of said supply advanced against said elements to feed tobacco to said pan, and means for terminating the operation of said elements when the set capacity of said pan is reached, said means including an electric circuit and a switch in said circuit arranged to control said mechanism.

41. In a cigar machine having a device for forming bunch charges of tobacco; mechanism for intermittently feeding limited quantities of tobacco comprising, a hopper having an elongated supporting and feeding bottom adapted to contain a supply of tobacco sufficient to supply said machine for a substantial period of time, means for holding back said supply of tobacco in said hopper including, a plurality of sets of rakes mounted for movement in substantially parallel planes transversely of said hopper and extending below the plane of the bottom of said hopper and constructed and arranged only to allow tobacco to move from the supply between said rakes, and means for moving one set of rakes oppositely to and past the other to control the feed of tobacco in a generally horizontal direction between said rakes from said hopper.

42. A tobacco feed device comprising a plurality of sets of open members mounted proximate each other in spaced substantially vertical different parallel planes for confining a bulk mass of tobacco against movement, each set comprising a plurality of elements spaced to permit tobacco to be fed through them, said members being mounted for movement in said different planes relative to each other back and forth across the entire face of the tobacco said members confine, and means for moving said members to produce a controlled substantially horizontal feeding of tobacco only through said members.

43. In a cigar machine having a device for forming cigar bunches, mechanism for feeding tobacco comprising, a vibratory hopper constructed and arranged to hold a supply of tobacco sufficient to operate said machine for a substantial period of time, said hopper being provided with an open discharge end, means for feeding limited quantities of tobacco from said hopper including a device for vibrating said hopper and all of said supply of tobacco, a plurality of vertical sets of relatively movable rakes mounted directly above said hopper, each set having spaced elongated members extending transversely across said hopper and holding back said supply against uncontrolled movement therefrom, a support for said rakes, rake driving mechanism and connections between said mechanism and vibrating device for operating said vibrating device to vibrate said hopper and advance said supply against said members and for driving said members back and forth past each other, whereby said members separate tobacco from the face of said mass held back by said members and control the feed of tobacco between said members from said supply in said hopper.

44. In a cigar machine having a device for forming cigar bunches, mechanism for feeding tobacco comprising, a vibratory hopper constructed and arranged to hold a supply of tobacco sufficient to operate said machine for a substantial period of time, said hopper being provided with an open discharge end, means for feeding limited quantities of tobacco from said hopper including a device for vibrating said hopper and all of said supply of tobacco, a plurality of vertical sets of relatively movable rakes mounted directly above said hopper, each set having spaced elongated members extending transversely across said hopper and holding back said supply against uncontrolled movement therefrom, a support for said rakes, rake driving mechanism, and connections between said mechanism and vibrating device for operating said vibrating device to vibrate said hopper and advance said supply against said rakes and for driving said rakes back and forth past each other, whereby said rakes separate tobacco from the face of said mass held back by said rakes and control the feed of tobacco between said members from said supply in said hopper, and means for incapacitating the operation of said vibrating device and rake driving mechanism when a predetermined quantity of tobacco has been fed from said hopper.

45. In a cigar machine, the combination with a hopper for holding a supply of filler tobacco, said hopper being provided with a rigid bottom surface over which tobacco is fed, of a plurality of rows of spaced movable elements mounted directly over said bottom surface for retarding movement of tobacco from said hopper and limiting the removal therefrom, means for moving said rows of elements over said surface, members supporting said hopper for vibratory movement of the entire hopper and contents thereof, a vibrator secured to said hopper, and means for intermittently setting said vibrator and elements in motion to feed tobacco in a stream over said rigid surface from said hopper for discharge into said machine, said rows of said elements moving to and fro past each other in paths transversely of the path of movement of the hopper bottom surface.

46. In a device for feeding tobacco into a cigar bunch making machine, the combination with a hopper having a substantially horizontal rigid bottom surface adapted to contain a supply of tobacco, of supports for said hopper, a plurality of sets of independently movable oscillatable rakes mounted directly above said bottom for retarding movement from said supply of tobacco to said hopper, rake driving means, a vibrator connected to said hopper and adapted to vibrate said hopper and the supply of tobacco contained therein for feeding tobacco therefrom into said machine, control mechanism for activating said vibrator whenever said tobacco is needed in said machine, and independently operated means under control of said mechanism for operating said rake driving means to move said rakes back and forth past each other transversely of the direction of movement of tobacco from said hopper during the operation of said vibrator.

47. In a device for feeding tobacco into a cigar bunch making machine, the combination with a hopper having a substantially horizontal rigid bottom surface adapted to contain a supply of tobacco, of supports for said hopper, a plurality of sets of independently movable oscillatable rakes mounted directly above said bottom for retarding movement of said supply of tobacco from said hopper, a vibrator connected to said hopper and adapted to vibrate said hopper and the supply of tobacco contained therein for feeding tobacco therefrom into said machine, control mechanism for activating said vibrator whenever said tobacco is needed in said machine, independently operated means under control of said mechanism for moving said rakes back and forth past each other transversely of the direction of movement of tobacco from said hopper while said vibrator is operating, and means for incapacitating said vibrator and rakes when a predetermined quantity of tobacco has been fed from said hopper.

48. In a cigar bunch making machine having a charge compression chamber, a member movable within said chamber for compressing tobacco therein, a support for said member, and a measuring device, a hopper having an elongated bottom surface constructed and arranged to hold a bulk supply of tobacco for controlled feed to said device, vibrator mechanism for vibrating said hopper, a plurality of sets of spaced substantially parallel rake members mounted over said bottom surface and adapted to hold back said supply of tobacco on said surface against uncontrolled delivery from said hopper, a trip control carried by said support, a trip mounted on said device, means operative cyclically for moving said support, and means operated by said trip control when tobacco in said chamber reaches a predetermined minimum for displacing said trip on said device to deliver the contents of said device to said chamber, and means operative in response to the discharge of tobacco from said device for initiating independent operation of said vibratory mechanism and movement of said rakes to and fro past each other transversely of the direction of movement of said bottom surface to feed additional tobacco to said device.

49. In a cigar bunch making machine having a charge compression chamber, a member movable within said chamber for compressing tobacco therein, a support for said member, and a measuring device, a hopper having an elongated bottom surface constructed and arranged to hold a bulk supply of tobacco for controlled feed to said device, vibrator mechanism for vibrating said hopper, a plurality of sets of spaced substantially parallel rake members mounted over said bottom surface and adapted to hold back said supply of tobacco on said surface against uncontrolled delivery from said hopper, a trip control carried by said support, a trip mounted on said device, means operative cyclically for moving said support, means operated by said trip control when tobacco in said chamber reaches a predetermined minimum for displacing said trip on said device to deliver the contents of said device to said chamber, means operative in response to the discharge of tobacco from said device for initiating independent operation of said vibratory mechanism and movement of said rakes to and from past each other transversely of the direction of movement of said bottom surface to feed additional tobacco to said device.

50. In a cigar machine, the combination with a charge measuring chamber, a plunger movable therein, and a trap door normally closing said chamber, and means for reciprocating said plunger at least once during each cycle of the machine, of means for controlling the feed of tobacco to said chamber, said means including a trip finger carried by said plunger, a trip latch mechanism arranged to be engaged by said finger whenever the supply of tobacco in said chamber reaches a predetermined quantity, a measuring device, and coacting means made operable by the tripping of said latch for opening said door, and means on said door for dumping said device to effect the feed of additional tobacco to said chamber.

51. In a tobacco feeding mechanism a hopper provided with an elongated bottom feeding and supporting surface, said surface being provided with vertically offset portions joined by a single transverse substantially vertical shoulder which divides the hopper into a tobacco holding section located above a tobacco discharge section, a plurality of rakes located directly over said surface and extending below the plane of the bottom of said holding section and operable closely adjacent and in front of said shoulder, and means for oscillating said rakes back and forth above said surface and past each other to separate tobacco from said tobacco held in said holding section by said rakes for delivery past said rakes onto said discharge section.

52. In a material feeding mechanism a hopper provided with material confining and discharge sections, with an approximately horizontal surface forming the bottom of each section, the surface of said confining section being positioned vertically above that of said discharge section and being adapted to hold a supply of material thereon, a plurality of rakes oppositely movable in spaced different substantially parallel planes confining said entire supply of material in said hopper and having their ends extending into adjacency with said discharge section, said rakes being so arranged with respect to the confining section to prevent feeding of material beneath said rakes, and means for oscillating said rakes past each other to feed material from said supply therethrough for delivery to said mechanism.

53. In a cigar machine, a tobacco receiving chamber, a single movable member normally closing said chamber, means for feeding tobacco to said chamber, a guide plate having that portion adjacent said member lying in a single plane extending downwardly into a position adjacent said chamber and coacting with said member for guiding tobacco into said chamber, means for moving said member to open said chamber for the reception of tobacco, the path of movement of said guide plate crossing the path of movement of said member, and means for moving said plate to guide tobacco into said open chamber.

54. The method of feeding tobacco and like material, which material consists of a heterogeneous dispersion of fibrous particles of varying length comprising, confining a bulk mass of said material, moving said mass as a heterogeneous whole to a separation location, at which location said material is partially prevented from moving forward at points substantially in the plane of said location, said points being in series and in separate planes, and changing the location of said points of said series relative to each other to cause separation of a portion of said material from said mass for passage between points of respective series, and causing said points of each series to move past adjacent points of the other series while maintaining the dispersion of said particles in said mass as fed relatively undisturbed.

55. The method of feeding fibrous material, which material consists of a heterogeneous dispersion of fibrous particles of varying lengths comprising, confining a bulk mass of said material, periodically causing said mass to move as a heterogeneous whole to a separation location, at which location said material is partially prevented from moving forward at points substantially in the plane of said location, said points being in series and in separate planes, and changing the location of said points of said series relative to each other during the movement of said mass to cause separation of a portion of said material from said mass for passage between points of respective series, and causing said points of each series to move past adjacent points of the other series while maintaining the dispersion of said particles in said mass being fed relatively undisturbed.

56. The method of feeding fibrous material, which material consists of a heterogeneous dispersion of fibrous particles of varying sizes comprising, confining a bulk mass of said material, causing said mass to move in a substantially horizontal plane as a heterogeneous whole to a separation location, at which location the advanced portion of said material is restrained from moving forward at points substantially in the plane of said location, said points being in series and in separate planes, and changing the location of said points of said series relative to each other to cause separation of a portion of said material from the face of the advanced portion of said mass for passage between points of respective series, and causing said points of each series to move past adjacent points of the other series while maintaining the dispersion of said particles in said mass as fed relatively undisturbed.

JAMES P. DURNING.